(12) United States Patent
Schill

(10) Patent No.: US 12,445,209 B2
(45) Date of Patent: Oct. 14, 2025

(54) RECEIVER AND A COMMUNICATION ASSEMBLY

(71) Applicant: Hydromea SA, Renens (CH)

(72) Inventor: Felix Schill, Renens (CH)

(73) Assignee: Hydromea SA, Renens (CH)

( * ) Notice: Subject to any disclaimer, the term of this patent is extended or adjusted under 35 U.S.C. 154(b) by 364 days.

(21) Appl. No.: 18/029,854

(22) PCT Filed: Oct. 6, 2021

(86) PCT No.: PCT/IB2021/059167
§ 371 (c)(1),
(2) Date: Mar. 31, 2023

(87) PCT Pub. No.: WO2022/074582
PCT Pub. Date: Apr. 14, 2022

(65) Prior Publication Data
US 2023/0388027 A1 Nov. 30, 2023

(30) Foreign Application Priority Data
Oct. 7, 2020 (CH) .................... 01276/20

(51) Int. Cl.
*H04B 13/02* (2006.01)
*G01J 1/02* (2006.01)
(Continued)

(52) U.S. Cl.
CPC ............ *H04B 13/02* (2013.01); *G01J 1/0266* (2013.01); *G01J 1/44* (2013.01); *H04B 10/11* (2013.01)

(58) Field of Classification Search
CPC ....... H04B 13/02; H04B 10/11; G01J 1/0266; G01J 1/44; G01J 2001/4406
See application file for complete search history.

(56) References Cited

U.S. PATENT DOCUMENTS 11,057,117 B2 * 7/2021 Lacovara ............... H04B 10/80

FOREIGN PATENT DOCUMENTS

CN 106330312 A 1/2017

OTHER PUBLICATIONS

International Search Report and Written Opinion for PCT/IB2021/059167, dated Mar. 14, 2022, 17 pgs.

* cited by examiner

*Primary Examiner* — Ankur Jain
(74) *Attorney, Agent, or Firm* — Blank Rome LLP

(57) ABSTRACT

A receiver (70), suitable for use in a communication assembly configured to operate underwater, the receiver comprising, at least first one or more photodetectors (62*a*) and second one or more photodetectors (62*b*), wherein the first one or more photodetectors (62*a*) define a first detection area which can receive light, and the second one or more photodetectors (62*b*) define a second detection area which can receive light; at least a first multiplexer (74) which is configurable to selectively electrically connect any of the first one or more photodetectors (62*a*) or second one or more photodetectors (62*b*) to a signal detector module (66); a controller (75) which is connected to said least a first multiplexer (74) so that the controller (4) can selectively configure the first multiplexer (74) to electrically connect any of the first one or more photodetectors (62*a*) or second one or more photodetectors (62*b*) to the signal detector module (66); wherein, the controller (75) is configured to, configure the first multiplexer (74) to electrically connect the first one or more photodetectors (62*a*) to the signal detector module (66) and then determine a first quality factor which is which is representative of the quality of a signal output from the first one or more photodetectors (62*a*) to the signal detector module (66); and configure the first multiplexer (74) to electrically connect the second one or more photo- (Continued)

detectors (62b) to the signal detector module (66) and then determine a second quality factor which is representative of the quality of a signal output from the second one or more photodetectors (62b) to the signal detector module (66); and compare the first quality factor and second quality factor to determine which signal output is better quality; and configure the first multiplexer (74) so that the first multiplexer (74) electrically connects whichever of the first one or more photodetectors (62a) or second one or more photodetectors (62b) provides said better quality signal output to the signal detector module (66). There is further provided a communication assembly which has the receiver (70).

15 Claims, 12 Drawing Sheets

(51) Int. Cl.
*G01J 1/44* (2006.01)
*H04B 10/11* (2013.01)

RECEIVER AND A COMMUNICATION ASSEMBLY

RELATED APPLICATIONS

The present application is a national phase of PCT/IB2021/059167, filed Oct. 6, 2021, which claims the benefit of Swiss Patent Application No. CH01276/20, filed Oct. 7, 2020. The entire disclosures of which are hereby incorporated by reference.

FIELD OF THE INVENTION

The present invention concerns a receiver, suitable for underwater applications, which comprises photodetectors which can receive light emitted by a transmitter; wherein the receiver has a controller which is configured to activate or deactivate, photodetectors in the receiver to obtain the best quality output signal. There is further provided a communication assembly which is suitable for use underwater, which comprises the receiver.

BACKGROUND TO THE INVENTION

Existing receivers for a free space optical modem are exposed to a large dynamic range of ambient light, from bright sunlight conditions to near-perfect darkness in the deep sea. Such receivers typically use PIN photo diodes, avalanche diodes and/or photo multiplier tubes which are capable of detecting individual photons. Recently, silicon photo multipliers (SiPMs) are also used, which are a parallel array of very small single-photo avalanche diodes (SPADs) formed on a silicon chip. Compared to PIN photo diodes, avalanche diodes, PMTs and SiPMs are much more sensitive to light and have a very high gain, allowing them to detect individual photons. These devices operate in Geiger mode, where a single photon triggers an avalanche, followed by a recovery period during which the detector resets itself into its original sensitive state. However disadvantageously single photon avalanche diodes (SPADs), silicon photo multipliers and/or photo multiplier tubes are easily saturated when the photon influx rate exceeds their recovery time. Due to the limitation of saturation, existing solutions are only suitable for use in dark environments (for example the deep sea); or else require narrow bandpass filters to exclude wavelengths that are different from the transmitter wavelength. Silicon photo multipliers partially address the saturation problem by combining an array containing a plurality of small-sized single photon avalanche diode (SPADs). Due to their small size, each of the individual photon avalanche diodes and/or photo multiplier tubes in the array only receives a small number of photons, and accordingly are less susceptible to saturation. This enables the silicon multiplier to remain sensitive to light inputs even after individual detectors have been hit by a photon and are within their recovery period, as long as there is a sufficient population of untriggered and/or recovered detectors within the array.

However, despite efforts to resolve the issues of saturation, existing receivers still have insufficient dynamic range for certain applications. Disadvantageously, existing receivers are insufficient for use in environments where a broad range of ambient light conditions can occur; for example, an existing receiver which is designed to work in an dark environment can be made very sensitive to detect weak signals, and therefore enable a long communication range, but will saturate if the ambient light increases significantly; a receiver which is which is designed to work in a very bright environment will fail to have the necessary sensitivity to detect very faint signals from a signal source at a great distance.

Another disadvantage of existing receivers is that there is often a trade-off between sensitivity and bandwidth. For example, receivers which comprise very large photodiodes have a high sensitivity and can detect very faint light signals, but due to their high capacitance can only convert low-frequency signals. Vice versa, receivers which comprise smaller photodiodes have a low sensitivity and cannot therefore detect faint light signals, limiting the possible communication range in a free space optical communication system (but due to their low capacitance are able to convert low-frequency signals). For receivers which comprises silicon photomultipliers (SiPMs) and/or single-photon avalanche diodes, the recovery time after a photon detection also depends on the detector size—small detectors are faster but less likely to collect a photon, and therefore have a lower sensitivity.

SUMMARY OF THE INVENTION

According to the present invention there is provided a receiver having, at least, the features which are recited in claim 1. The dependent claims recite favourable, optional, features of various embodiments of the invention.

Advantageously in the receiver of the present invention the controller determines which photodetectors are best suited to receiving the signal which is being transmitted to the receiver by determining a quality factor which is representative of the quality of the signal output form the different photodetectors in the receiver. The controller then configures the receiver so that the photodetectors that are providing the best quality output signal is connected to the signal detector of the receiver.

In some embodiments while one of the photodetectors is connected to the signal decoder, the quality factor of the signal output from the other photodetectors in the receiver is determined; and if it is determined that the quality factor of the signal output from one of the other photodetectors is better that the quality of the signal which is output from the photodetector which is currently connected to the signal decoder, then the controller adjusts the receiver so that the photodetector which provides the better quality output signal is connected to the signal decoder.

In other embodiments, such as the embodiment recited in independent claim 7, the receiver of the present invention, there is a plurality of different detection areas, which can be selectively activated or deactivated depending on the light conditions; activating more detection areas results in the receiver having a larger detection area over which photons can be detected, and therefore increases the sensitivity of the receiver. When ambient light decreases, this will result in a decrease in the signal at an output node of the receiver; when the signal at the output node drops to below a predefined threshold, a controller will activate a larger detection area of the receiver so as to increase the sensitivity of the receiver. If ambient light increases, and consequently the signal at the output node increases and approaches saturation, a controller can deactivate one or more of the detection areas to decrease the overall sensitivity of the receiver and avoid saturation. Accordingly, the receiver of the present invention can dynamically adapt to accommodate changing light conditions, thereby providing a receiver which has a broader range. It should be noted that the plurality of different detection areas may be of identical properties, or may have different size, or may have different sensitivity to light.

In addition to adaptation to ambient light conditions, the receiver of the present invention can also adapt to varying light intensities (for example a plurality of light pulses, having different light intensities, encoding a message) which are incident on the receiver. In another embodiment the controller is configured to increase the active light detection area (e.g. by closing one or more switches in the receiver so that more photodetectors are active) and thus increase the sensitivity of the receiver to the incident light, if the signal at the output of the receiver decreases below a predefined threshold. In another embodiment the controller is configured to reduce the active light detection area to decrease the sensitivity of the receiver to the incident light (e.g by opening one or more switches in the receiver so that less photodetectors are active), if the signal at the output of the receiver is above a predefined threshold; this may increase the bandwidth of the receiver for some types of photodetectors.

In one embodiment of the receiver, first one or more photodetectors define a first detection area which can receive light, and second one or more photodetectors define a second detection area which can receive light In one embodiment the receiver comprises different types of photodetectors wherein one or more of the photodetectors are configured to receive light within a first predefined frequency range (e.g. the one or more photodetectors which define the first detection area could be configured to receive light within the first predefined frequency range), and one or more of the photodetectors are configured to receive light within a second predefined frequency range (e.g. the one or more photodetectors which define the second detection area could be configured to receive light within the second predefined frequency range) wherein the first and second predefined frequency ranges are different, non-overlapping, ranges; and wherein the controller is configured to activate the photodetectors which are configured to receive light within a second predefined frequency range when the signal at the output of the receiver is above a predefined threshold; and wherein the controller is configured to activate the photodetectors which are configured to receive light within the second predefined frequency range when the signal at the output of the receiver is below a predefined threshold.

The receiver is preferably configured for use underwater. In the most favorable application, the receiver will be deployed, underwater (in the ocean), to receive optical signals which are transmitted by transmitters which are also located underwater. According to a further aspect of the present invention there is provided a communication assembly configured to operate in an underwater environment, the assembly comprising, a transmitter which is selectively operable to emit light, and a receiver according to any embodiment of the present invention, to receive light emitted by the transmitter. In the preferred embodiment the receiver of the assembly, is located on submarine drone, and/or on a submerged sensor. In another embodiment the communication assembly, is located on submarine drone, and/or on a submerged sensor. In the preferred embodiment the receiver of the assembly is located on a submerged asset and connected via an electric or fibre-optic cable to a location above water to enable data communication with an operator, or global communication networks. In another embodiment the communication assembly is located on a submerged asset and connected via an electric or fibre-optic cable to a location above water to enable data communication with an operator, or global communication networks.

BRIEF DESCRIPTION OF DRAWINGS

Exemplary embodiments of the invention are disclosed in the description and illustrated by the drawings in which.

DETAILED DESCRIPTION OF EMBODIMENTS OF THE PRESENT INVENTION

According to the present invention there is provided a receiver which comprises at least first one or more photodetectors and second one or more photodetectors, wherein the first one or more photodetectors define a first detection area which can receive light, and the second one or more photodetectors define a second detection area which can receive light;

at least a first electrically controllable switch and second electrically controllable switch, wherein the first electrically controllable switch may be selectively closed so as to electrically connect the first one or more photodetectors to an output node, and the second electrically controllable switch may be selectively closed so as to connect the second one or more photodetectors to the output node, a controller which is connected to said at least first electrically controllable switch and second electrically controllable switch so that the controller can selectively operate the first and second controllable switches, wherein, when the first electrically controllable switch is closed, the controller is configured to close the second switch when the signal at the output node is below a predefined threshold, so that the second one or more photodetectors which define a second detection area is electrically connected to the output node, so as to increase sensitivity of the receiver to light incident on the receiver.

Figure 1:
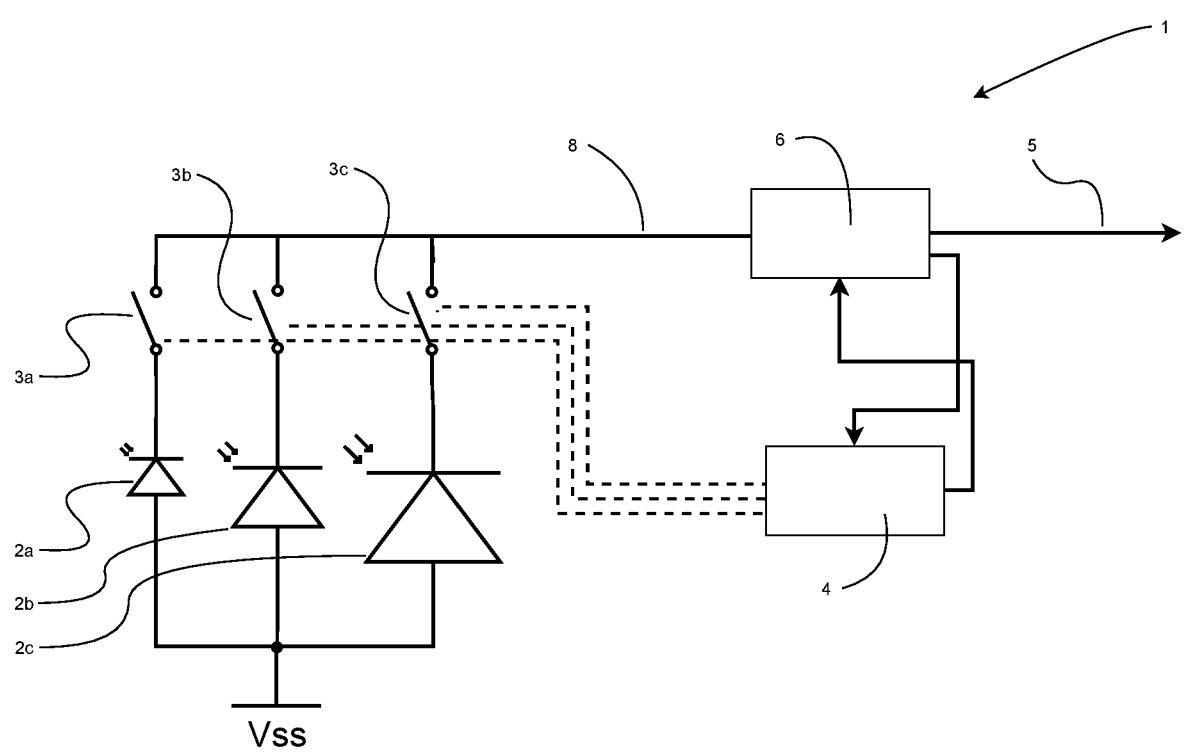
FIG. 1 is a block diagram illustrating the features of a receiver according to an embodiment of the present invention.
Figure 2:
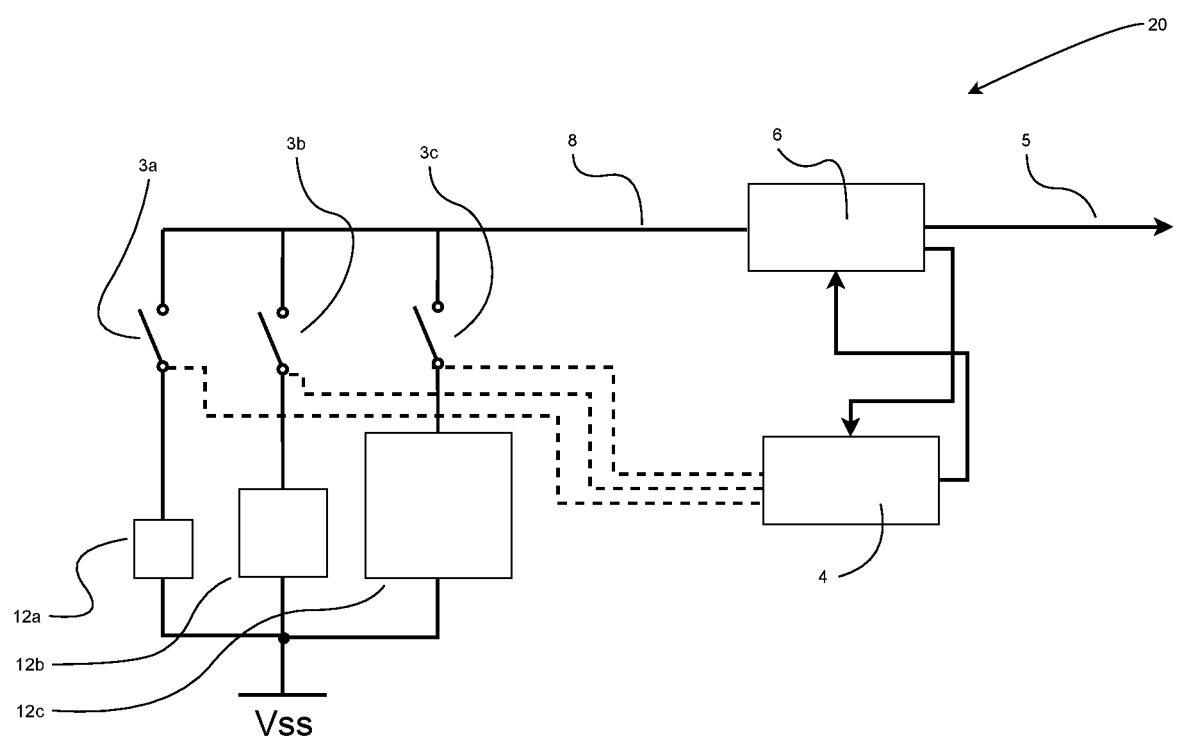
FIG. 2 is a block diagram illustrating the features of a receiver according to an embodiment of the present invention.

In one embodiment the first electrically controllable switch is arranged between the first one or more photodetectors and an output node of the receiver, and wherein the second electrically controllable switch is arranged between the second one or more photodetectors which define a second detection area and the output node (as shown in the embodiments illustrated in FIGS. 1-2). Most preferably the first electrically controllable switch is arranged between the first one or more photodetectors and an intermediate node, and wherein the second electrically controllable switch is arranged between the second one or more photodetectors which define a second detection area and the intermediate node, wherein the intermediate node is a node which is, or can be selectively, electrically connected to the output node. The controller may be configured to activate the first detection area by closing the first electrically controllable switch; the controller may be configured to deactivate the first detection area by opening the first electrically controllable switch; the controller may be configured to activate the second detection area by closing the second electrically controllable switch; and the controller may be configured to deactivate the second detection area by opening the second electrically controllable switch.

Figure 3:
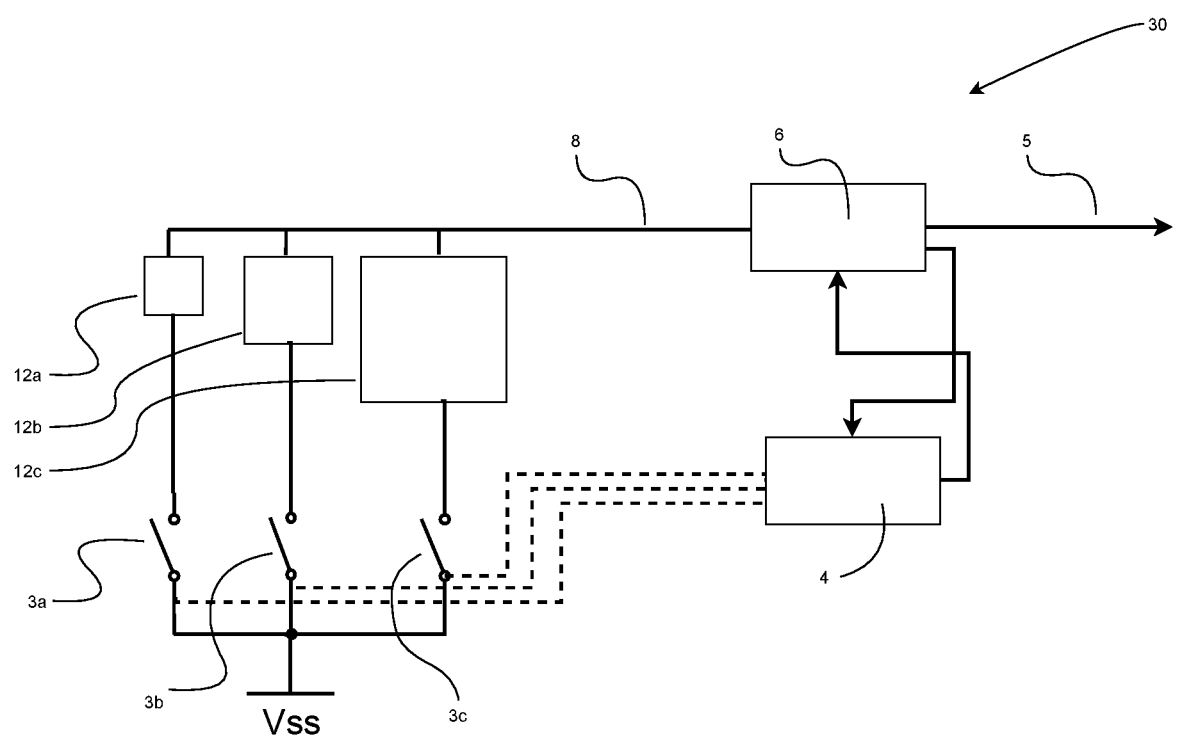
FIG. 3 is a block diagram illustrating the features of a receiver according to an embodiment of the present invention.
Figure 4:
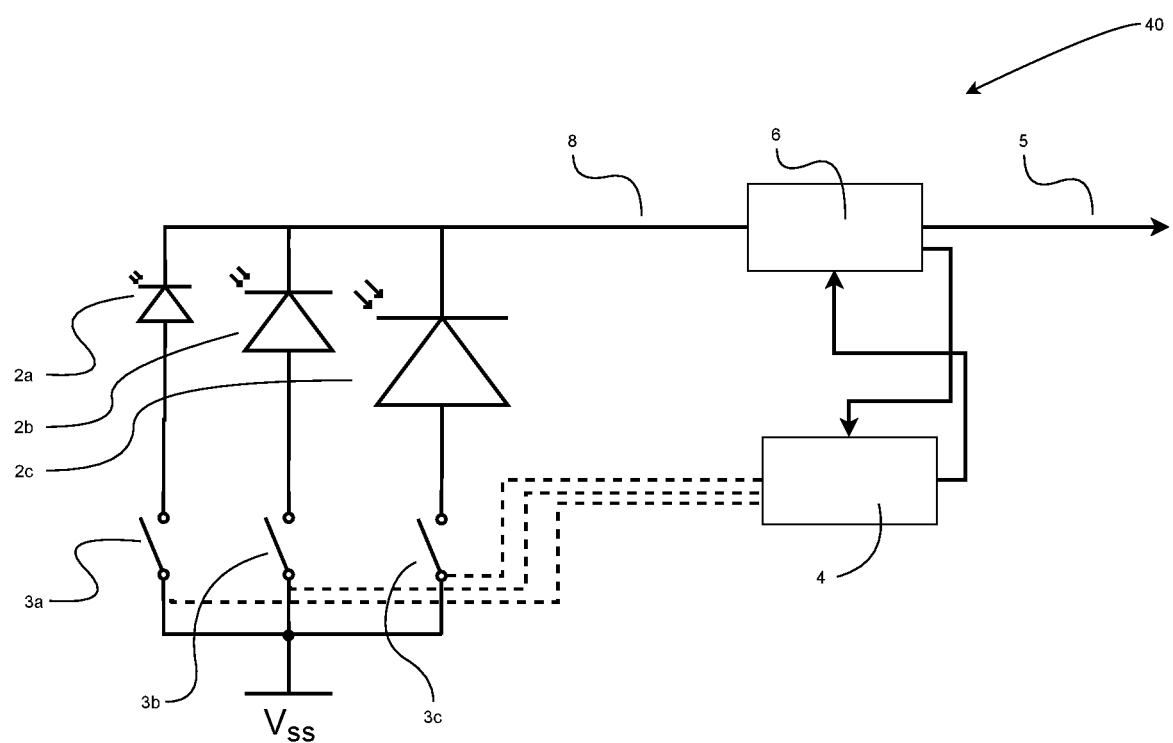
FIG. 4 is a block diagram illustrating the features of a receiver according to an embodiment of the present invention.

In another embodiment the first electrically controllable switch is arranged between the first one or more photodetectors and a bias voltage supply node, and wherein the second electrically controllable switch is arranged between the second one or more photodetectors which define the second detection area a bias voltage supply node (as shown in the embodiments illustrated in FIGS. 3-4). The bias voltage supply nodes may have the same, or different, voltage levels; or there may be one single common bias voltage supply node (as is the case in the embodiments shown in FIGS. 3-4). The controller may be configured to activate the first detection area by closing the first electrically controllable switch; the controller may be configured to deactivate the first detection area by opening the first electrically controllable switch; the controller may be configured to activate the second detection area by closing the second electrically controllable switch; and the controller may be configured to deactivate the second detection area by opening the second electrically controllable switch.

In one embodiment the first and second detection areas are the same size areas. In another embodiment the first detection area is larger than the second detection area.

In the preferred embodiment the first and second detection areas are configured to have different light sensitivities. For example, in one embodiment the second detection area is configured to be more sensitive to light (i.e. photons) than the first detection area. In another embodiment the first detection area is configured to be more sensitive to light (i.e. photons) than the second detection area. It should be noted that different sensitivities can be implemented many different ways. In the present invention the first and second detection areas are different sized areas so that the sensitivity of the first and second detection areas differ; the larger detection area results in a greater sensitivity.

However, it should be understood that the present invention is not limited to achieving different sensitivities by the first and second detection areas having different sized areas. Other optional implementations for ensuring that the first and second detection areas are configured to have different light sensitivities include, but are not limited to, connecting multiple photodetectors in the detection area in parallel, and/or using optical filters, such as, but not limited to, neutral density filters, bandpass filters, or polarising filters, to reduce the light sensitivity of a detection area by reducing the amount of light that falls onto the photodetectors of that detection area. Another means to alter the sensitivity of a light detector, in particular for avalanche diodes and silicon photomultipliers, is to provide different voltages at respective bias voltage supply nodes. The sensitivity of avalanche detectors, such as single-photon avalanche diodes (SPADs) and silicon photomultipliers (SiPMs), depends on the bias voltage, whereas a greater bias voltage (e.g. the level of voltage supplied at said bias voltage supply node) results in greater sensitivity. Any of these implementations can be used in combination or exclusively to ensure that the the first and second detection areas are configured to have different light sensitivities.

In the preferred embodiment the first and second detection areas are of different sizes. For example, in one embodiment the second detection area is larger than the first detection area. For example, the second detection area may be configured to be twice the size of the first detection area. By closing the second electrically controllable switch, and opening the first electrically controllable switch, the total area which the receiver has available for detection of light is twice of the area provided by the first detection area alone. By closing both the first electrically controllable switch and the second electrically controllable switch, the total area which the receiver has available for detection of light is then three times the area provided by the first detection area alone. By increasing the area the receiver has available for detection of light one increases the sensitivity of the receiver to detect light.

In a further embodiment the receiver may have third one or more photodetectors which define a third detection area. In one embodiment a third electrical switch is connected between a bias voltage supply node and the third one or more photodetectors which define a third detection area. In another embodiment a third electrical switch is arranged between the third one or more photodetectors which define the third detection area and the output node. Most preferably the third electrically controllable switch is arranged between the third one or more photodetectors and the intermediate node. In another embodiment the third electrically controllable switch is arranged between a bias voltage supply node and the third one or more photodetectors which define a third detection area.

The third detection area may be larger than the second detection area and the first detection area. For example, the third detection area may be four times the size of the first detection area. Any desired total area of integer numbers '0' to '7' can be achieved by using different combinations of switches and detection areas.

It should be noted that the receiver of the present invention may have any number of detection areas; preferably the receiver of the present invention will have a corresponding number of electrically controllable switches. Each respective switch is preferably arranged between a respective detection area and the output node. Preferably each respective switch is arranged between a respective detection area and the intermediate node. In another embodiment each respective electrically controllable switch is connected between a bias voltage supply node and a respective detection area.

FIG. 1 is a block diagram illustrating the features of a receiver 1 according to one embodiment of the present invention. The receiver 1 is suitable for use underwater; for example, the receiver is suitable for use in a communication assembly which is located and operated underwater. It should be understood that while the receiver of the present invention is described as being suitable for use underwater, the receiver could also be used in a dry-land environment.

The receiver 1 comprises at first one or more photodetectors 2a, second one or more photodetectors 2b, and third one or more photodetectors 2c. The first one or more photodetectors define a first detection area which can receive light; the second one or more photodetectors 2b define a second detection area which can receive light; and the third one or more photodetectors 2c define a third detection area which can receive light. The second detection area is larger than the first detection area, and the third detection area is larger than the second detection area. Specifically, in this example, the first one or more photodetectors 2a comprise a first photodetector 2a and second one or more photodetectors 2b comprise a second photodetector 2b, and third one or more photodetectors 2c comprise a third photodetector 2c, and wherein the second photodetector 2b is larger than the first photodetector 2a, and wherein the third photodetector 2c is larger than the second photodetector 2b. The larger sized photodetectors provide for a larger detection area for the detection of light (photons), hence the second photodetector 2b provides a larger detection area than the detection area provided by the first photodetector 2a, and the third photodetector 2c provides a larger detection area than the detection area provided by the second photodetector 2b. In this example the first photodetector 2a defines a first detection area which has dimensions 1×1 mm; the second photodetector 2b defines a second detection area which has dimensions 3×3 mm; and the third photodetector 2c defines a third detection area which has dimensions 6×6 mm.

It should be understood that, for clarity FIG. 1 shows only one first photodetector 2a, only one second photodetector 2b, and only one third photodetector 2c; however, the invention is not limited to having just one of each sized photodetectors. For example, the receiver 1 may comprise a plurality of first photodetectors 2a, a plurality of second photodetectors 2b, and a plurality of third photodetectors 2c.

The receiver 1 further comprises a first electrically controllable switch 3a, a second electrically controllable switch 3b, and a third electrically controllable switch 3c. The first electrically controllable switch 3a is arranged between the first photodetector 2a and an intermediate node 8; the second electrically controllable switch 3b is arranged between the second photodetector 2b and the intermediate node 8; and the third electrically controllable switch 3c is arranged between the third photodetector 2c and intermediate node 8. The first electrically controllable switch 3a may be selectively closed so as to electrically connect the first photodetector 2a to the intermediate node 8; the second electrically controllable switch 3b may be selectively closed so as to connect the second photodetector 2b to the intermediate node 8; and the third electrically controllable switch 3c may be selectively closed so as to connect the third photodetector 2c to the intermediate node 8. The first electrically controllable switch 3a may be selectively opened so as to electrically disconnect the first photodetector 2a from the intermediate node 8; the second electrically controllable switch 3b may be selectively opened so as to disconnect the second photodetector 2b from the intermediate node 8; and the third electrically controllable switch 3c may be selectively opened so as to disconnect the third photodetector 2c from the intermediate node 8.

The receiver 1 further comprises a controller 4 which is connected to the first electrically controllable switch 3a, the second electrically controllable switch 3b, and the third electrically controllable switch 3c, respectively, so that the controller 4 can selectively operate the first, second and third controllable switches 3a-c. In this embodiment each of the first, second and third electrically controllable switches 3a-c comprise a respective transistor; however, it should be understood that the first, second and third electrically controllable switches 3a-c may take any suitable form.

The receiver 1 further comprises an amplifier 6, which is arranged between the intermediate node 8 and the output node 5, so that the amplifier 6 can amplify a signal which is at the intermediate node 8 before it reaches the output node 5. It should be noted that any one or more of the first, second and/or third photodetectors 2a-c may be electrically connected to the intermediate node 8 by closing the respective first, second and/or third electrically controllable switches 3a-c; and the signal at the intermediate node 8 is equal to the sum of the output of the photodetector(s) which are electrically connected to the intermediate node 8. The amplifier 6 has a gain which is adjustable between a predefined minimum gain value and a predefined maximum gain value. The higher the gain, the more amplification of the signal at the intermediate node which the amplifier provides, so when the gain is at the predefined maximum gain value the amplifier 6 will provide a maximum amplification of the signal at the intermediate node 8; conversely when the gain is at the predefined minimum gain value the amplifier 6 will provide a minimum amplification of the signal at the intermediate node 8.

In this embodiment the controller 4 is further connected to output node 5 and also to the amplifier 6, and the controller 4 is further configured to increase the gain of the amplifier 6 by an amount which is inversely proportional to a decrease in the signal at the output node 5, and to decrease the gain of the amplifier 6 by an amount which is inversely proportional to an increase in the signal at the output node 5. Increasing the gain of the amplifier 6 by an amount which is inversely proportional to a decrease in the signal at the output node 5, and decreasing the gain of the amplifier 6 by an amount which is inversely proportional to an increase in the signal at the output node 5, helps to reduce the volatility of the signal at the output node 5. For example, if the first electrically controllable switch 3a is closed so that the first photodetector 2a is electrically connected to the intermediate node 8, and if the amount of light incident on the first photodetector 2a decreases due to some environmental changes (e.g. darkening of the environment in which the first photodetector 2a is located), the level of the signal at the output node 5 will begin to decrease; in response, the controller 4 will increase the gain of the amplifier 6 in an attempt to prevent the signal at the output node 5 from decreasing. However, since the amplifier 6 has a predefined maximum gain value which cannot be exceeded, there is a limit to the extent to which the adjustment of the gain can compensate for a decrease in the amount of light incident on the first photodetector 2a.

If the receiver 1 is in a state wherein the first electrically controllable switch 3a is closed and the second and third electrically controllable switches 3b,3c are open, the controller 4 is configured to close the second electrically controllable switch 3b when a signal at the output node 5 (most preferably an average of the signal at the output node 5 taken over a predefined time period) is below a first predefined threshold, and the gain of the amplifier 6 has already been increased to the predefined maximum. The controller 4 is preferably further configured to reduce the gain of the amplifier 6 to predefined minimum gain value after the second electrically controllable switch 3b is closed. (Optionally, in an embodiment the controller 4 may be further configured to open the first electrically controllable switch 3a when the second electrically controllable switch 3b has been closed (so that only the second electrically controllable switch 3b is closed, and both the first and third electrically controllable switches 3a,3c are open).

If the receiver 1 is in a state wherein the third electrically controllable switch 3c is open and the first and second electrically controllable switches 3a,3b are closed, the controller 4 is further configured to close the third electrically controllable switch 3c when a signal at the output node 5 (most preferably an average of the signal at the output node 5 taken over a predefined time period) is below a second predefined threshold, and the gain of the amplifier 6 has already been increased to the predefined maximum. The controller 4 is preferably further configured to reduce the gain of the amplifier 6 to predefined minimum gain value after the third electrically controllable switch 3c is closed. (Optionally, the controller 4 may be further configured to open the second electrically controllable switch 3b when the third electrically controllable switch 3c has been closed (so that only the third electrically controllable switch 3c is closed, and both the first and second electrically controllable switches 3a,3c are open).)

A decrease in the signal at the output node 5 typically occurs due to a reduction in the light incident on the receiver 1; for optimal operation of the receiver 1 in reduced light conditions, the sensitivity of the receiver should be increased: by closing the second electrically controllable switch 3b as the signal at the output node 5 (most preferably an average of the signal at the output node 5 taken over a predefined time period) drops to below a first predefined threshold, the controller 4 activates the second photodetector 2b; since the sum of the area of the first and second photodetector 2a and 2b is larger than the area of only the first photodetector 2a the sensitivity of the receiver is thus increased.

Likewise if the light incident on the receiver continues to decrease further the sensitivity of the receiver 1 should be increased further: by closing the third electrically controllable switch 3c as the signal at the output node 5 (most preferably an average of the signal at the output node 5 taken over a predefined time period) drops to below a second predefined threshold, the controller 4 activates the third photodetector 2c; since the third photodetector 2c has a larger detection area than the second photodetector 2b the sensitivity of the receiver it thus increased further.

The controller may also be configured such that it selectively closes or opens the switches 3a, 3b, 3c to result in the receiver 1 having light sensitivities which are intermediate to the light sensitivities which are achieved when only one of the first, second or third electrically controllable switches 3a-c are closed exclusively. Any one or more of the three electrically controllable switches 3a-c could be closed in any combination to achieve an intermediate sensitivity. For example, closing only the second electrically controllable switch 2b results in a total active detection area of only the second photodetector 2b, which is larger than the area of only the first photodetector 2a when only the first switch 3a is closed, and smaller than the area of the first and second photodetector 2a,2b combined when both switches 3a,3b are closed.

Conversely, as the light incident on the receiver 1 increases, the sensitivity of the receiver is preferably reduced to avoid saturation:

If the receiver 1 is in a state wherein the first and second and third electrically controllable switches 3a,3b,3c are closed, the controller 4 is further configured to open the third electrically controllable switch 3c, when a signal at the output node 5 (most preferably an average of the signal at the output node 5 taken over a predefined time period) is above a third predefined threshold, and the gain of the amplifier 6 has already been decreased to the predefined minimum. The controller 4 is preferably further configured to increase the gain of the amplifier to predefined maximum gain value after the third electrically controllable switch 3c is opened.

If the receiver 1 is in a state wherein the third electrically controllable switch 3c is open and the first and second electrically controllable switches 3a,3b are closed, the controller 4 is further configured to open the second electrically controllable switch 3b, when a signal at the output node 5 (most preferably an average of the signal at the output node 5 taken over a predefined time period) is above the first predefined threshold, and the gain of the amplifier 6 has already been decreased to the predefined minimum. The controller 4 is preferably further configured to increase the gain of the amplifier 6 to predefined maximum gain value after the second electrically controllable switch 3b is opened.

In another embodiment, the controller 4 comprises a memory which stores a look-up table comprising as entries, switch positions (i.e. 'open' or 'closed') for each of the first, second and third electrically controllable switches 3a-c, and amplifier gain values for the amplifier 6, corresponding to different predefined levels voltages at the output node 5 can exhibit. In this embodiment the controller 4 is configured to read the level of voltage at the output of the receiver 1, identify the entry in the look-up table which has a voltage value corresponding to said level of voltage which the controller 4 read at the output; and retrieve from the look-up table the switch positions and amplifier gain value corresponding to that level of voltage; the controller 4 is further configured to then operate the electrically controllable switches 3a-c in the receiver so that they have positions corresponding to the positions which the controller 4 retrieved from the look-up table, and the controller is further configured to adjust the gain of the amplifier 6 so that it is equal to the amplifier gain value which the controller retrieved from the look-up table. Preferably the look-up table is constructed a-priori in a calibration step (i.e. suitable positions (i.e. 'open' or 'closed') for each of the first, second and third electrically controllable switches 3a-c, and amplifier gain values for the amplifier 6, for different levels of voltage at the output node 5 are determined experimentally in a calibration step, such that they enable a predefined level performance of the receiver 1 for a wide range of light levels.)

In another embodiment, the controller 4 comprises an artificial neural network which comprise subsets of artificial neurons wherein each subset has inputs and an outputs; wherein each of the inputs of a subset of artificial neurons are connected to the output node 5, and wherein the outputs of a subset of artificial neurons are connected to each of the electrically controllable switches 3a, 3b, 3c, and the adjustable gain of the amplifier 6. Then depending on the input to the subset the signals at the outputs of a subset of artificial neurons will open and/or close one or more of the electrically controllable switches 3a, 3b, 3c, and set the gain of the amplifier 6. The artificial neurons preferably comprise a set of weight factors associated with the inputs of the artificial neuron and may comprise a non-linear output function. The weight factors can preferably be determined through supervised or unsupervised machine learning methods, for example error backpropagation and gradient descent, or reinforcement learning.

FIG. 2 is a block diagram illustrating the features of a receiver 20 according to another embodiment of the present invention. The receiver 20 has many of the same features as the receiver 1 shown in FIG. 1, and like features are awarded the same reference numbers.

The only difference between the receiver 20 shown in FIG. 2 and the receiver 1 shown in FIG. 1, is that in the receiver 20, the first one or more photodetectors 2a comprise a first array of photodetectors 12a and second one or more photodetectors 2b comprise a second array of photodetectors 12b, and third one or more photodetectors 2c comprise a third array of photodetectors 12c. Most preferably the size of the photodetectors in each of the first, second and third arrays, are equal; however the number of photodetectors in the second array is larger than the number of photodetectors in the first array, and the number of photodetectors in the third array is larger than the number of photodetectors in the second array. The larger number of photodetectors provides for a larger detection area, hence the second array of photodetectors 12b provides a larger detection area than the detection area provided by first array of photodetectors 12a, and the third array of photodetectors 12c provides a larger detection area than the detection area provided by the second array of photodetectors 12b.

The receiver 20 also operates the same way as the receiver 1 of FIG. 1; in particular the controller 4 is configured in the same way, to close and/or open the first, second and/or third electrically controllable switches 3a-c.

FIG. 3 is a block diagram illustrating the features of a receiver 30 according to another embodiment of the present invention. The receiver 30 has many of the same features as the receiver 20 shown in FIG. 20, and like features are awarded the same reference numbers.

The only difference between the receiver 30 shown in FIG. 3 and the receiver 20 shown in FIG. 2, is that in the receiver 30, the first electrically controllable switch 3a is arranged between the first array of photodetectors 12a and a bias voltage supply node (Vss); and the second electrically controllable switch 3b is arranged between the second array of photodetectors 12b and the bias voltage supply node (Vss); and the third electrically controllable switch 3b is arranged between the third array of photodetectors 12c and a bias voltage supply node (Vss).

The receiver 30 also operates the same way as the receiver 20 of FIG. 2; in particular the controller 4 is configured in the same way, to close and/or open the first, second and/or third electrically controllable switches 3a-c.

FIG. 4 is a block diagram illustrating the features of a receiver 40 according to another embodiment of the present invention. The receiver 40 has many of the same features as the receiver 1 shown in FIG. 1, and like features are awarded the same reference numbers.

The only difference between the receiver 1 shown in FIG. 1 and the receiver 40 shown in FIG. 4, is that in the receiver 40, the first electrically controllable switch 3a is arranged between the first one or more photodetectors 2a and a bias voltage supply node (Vss); and the second electrically controllable switch 3b is arranged between the second one or more photodetectors 2b and the bias voltage supply node (Vss); and the third electrically controllable switch 3b is arranged between the third one or more photodetectors 2c and a bias voltage supply node (Vss). In this embodiment the receiver 40 has a single, common, bias voltage supply node (Vss), however it should be understood that in another embodiment the first electrically controllable switch 3a is arranged between the first one or more photodetectors 2a and a first bias voltage supply node (Vss); and the second electrically controllable switch 3b is arranged between the second one or more photodetectors 2b and a second bias voltage supply node (Vss'); and the third electrically controllable switch 3b is arranged between the third one or more photodetectors 2c and a third bias voltage supply node (Vss"); and the voltages provided at the respective first, second and third bias voltage supply nodes may be different so that the respective detection areas have different sensitivity to light (e.g. photodetectors belonging to the second detection area may be made to be more sensitive to light than the photodetectors belonging to the first detection area by providing a larger voltage at the second bias voltage supply node than the voltage supplied at the first bias voltage supply node).

The receiver 40 also operates the same way as the receiver 1 of FIG. 1; in particular the controller 4 is configured in the same way, to close and/or open the first, second and/or third electrically controllable switches 3a-c.

It should be understood that in each of the above-mentioned receiver 1,20, 30, 40 embodiments the photodetectors may take any suitable form. Most preferably the photodetectors comprise silicon photomultipliers. In the embodiments in which the receiver comprises silicon photomultiplier devices (SiPMs), the receiver may comprise an array of micro-cells that are single-photon avalanche diodes (SPADs) provided on an integrated detector chip, wherein all micro-cells are connected in parallel. In another embodiment the receiver may comprise a plurality of integrated detector chips which are connected in parallel to create a larger array, that is functionally equivalent to a larger chip with the same amount of micro-cells, and the same total area, as the sum of the smaller parallel connected chips.

Also in each of the above-mentioned receiver 1,20,30,40 embodiments, the receiver 1,20,30,40 may further comprise, a filter which is arranged to filter the signal at the output node 5 so as to provide a filtered output signal. In a preferred embodiment the filter is configured to filter out a direct current component of the signal at the output. Also in each of the above-mentioned receiver 1,20,30,40 embodiments, the receiver 1,20,30,40 may further comprise a processing device which is connected to the filter so that the processing device can receive the filtered output signal, and wherein the processing device comprises a processor which is configured to decode the filtered signal. In one embodiment the processor is configured to convert the filtered signal to a digital signal by comparing filtered signal to a predefined threshold, and decoding each part of the filtered signal which is above the predefined threshold as corresponding to a '1' in a transmitted signal which was received by the receiver, and each part of the filtered signal which is below the predefined threshold as corresponding to a '0' in said transmitted signal.

Figure 5:
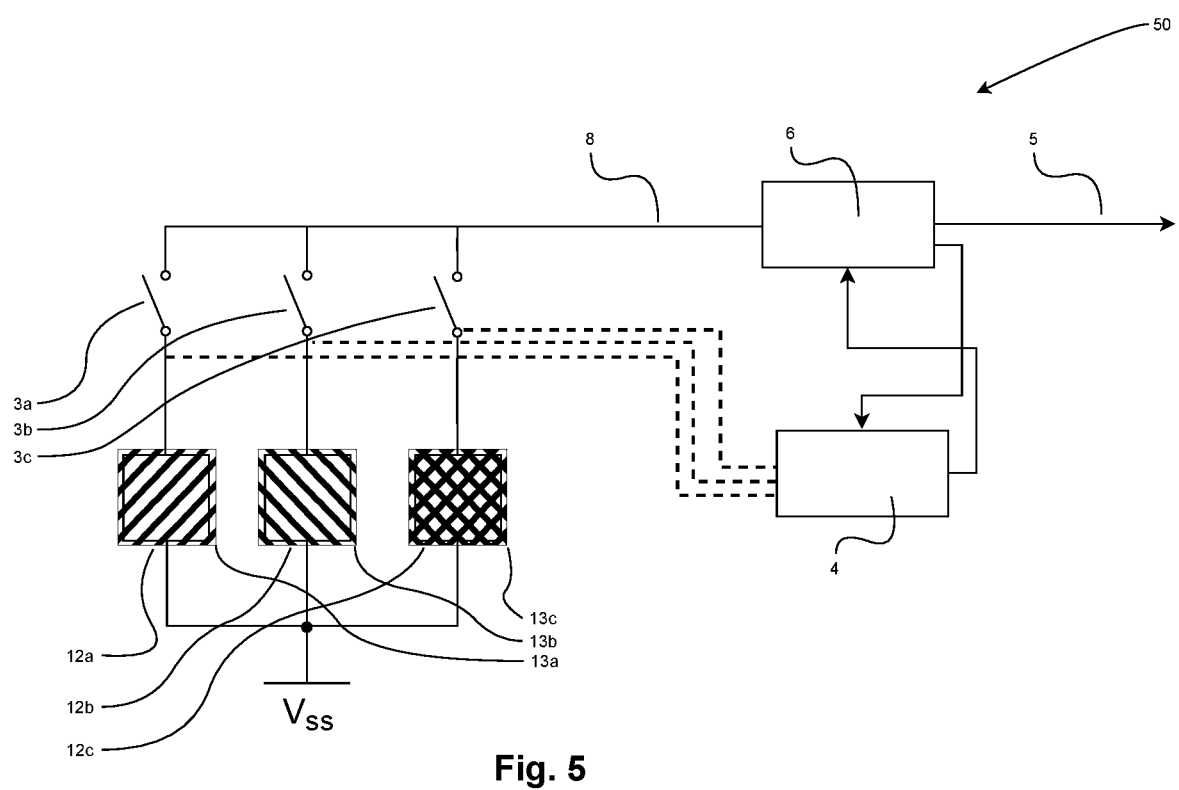
FIG. 5 is a block diagram illustrating the features of a receiver according to an embodiment of the present invention.

FIG. 5 is a block diagram illustrating the features of a receiver 50 according to another embodiment of the present invention. The receiver 50 has many of the same features as the receiver 20 shown in FIG. 2, and like features are awarded the same reference numbers.

In the receiver 50 shown in FIG. 5, is that in the receiver 50, the first array of photodetectors 12a each comprises a first bandpass filter 52a which is configured to filter light within a first wavelength range; second array of photodetectors 12b comprises a second bandpass filter 52b which is configured to filter light within a second wavelength range which is different to the first wavelength range; and the third array of photodetectors 12c comprises a third bandpass filter which is configured to filter light within a third wavelength range which is different to the first and second wavelength ranges. Most preferably the size of the photodetectors in each of the first, second and third arrays, are equal; however the number of photodetectors in the second array is larger than the number of photodetectors in the first array, and the number of photodetectors in the third array is larger than the number of photodetectors in the second array. The larger number of photodetectors provides for a larger detection area, hence the second array of photodetectors 12*b* provides a larger detection area than the detection area provided by first array of photodetectors 12*a*, and the third array of photodetectors 12*c* provides a larger detection area than the detection area provided by the second array of photodetectors 12*b*.

The receiver 50 also operates the same way as the receiver 1 of FIG. 1; in particular the controller 4 is configured in the same way, to close and/or open the first, second and/or third electrically controllable switches 3*a*-*c*. However the bandpass filters 52*a*,52,*b*,52*c* will influence the amount of light incident on each of the respective arrays of photodetectors 12,*a*,12,*b*,12*c*, and thus will ultimately influence which of the first, second and/or third electrically controllable switches 3*a*-*c* are opened/closed by the controller 4 during operation.

Figure 6:
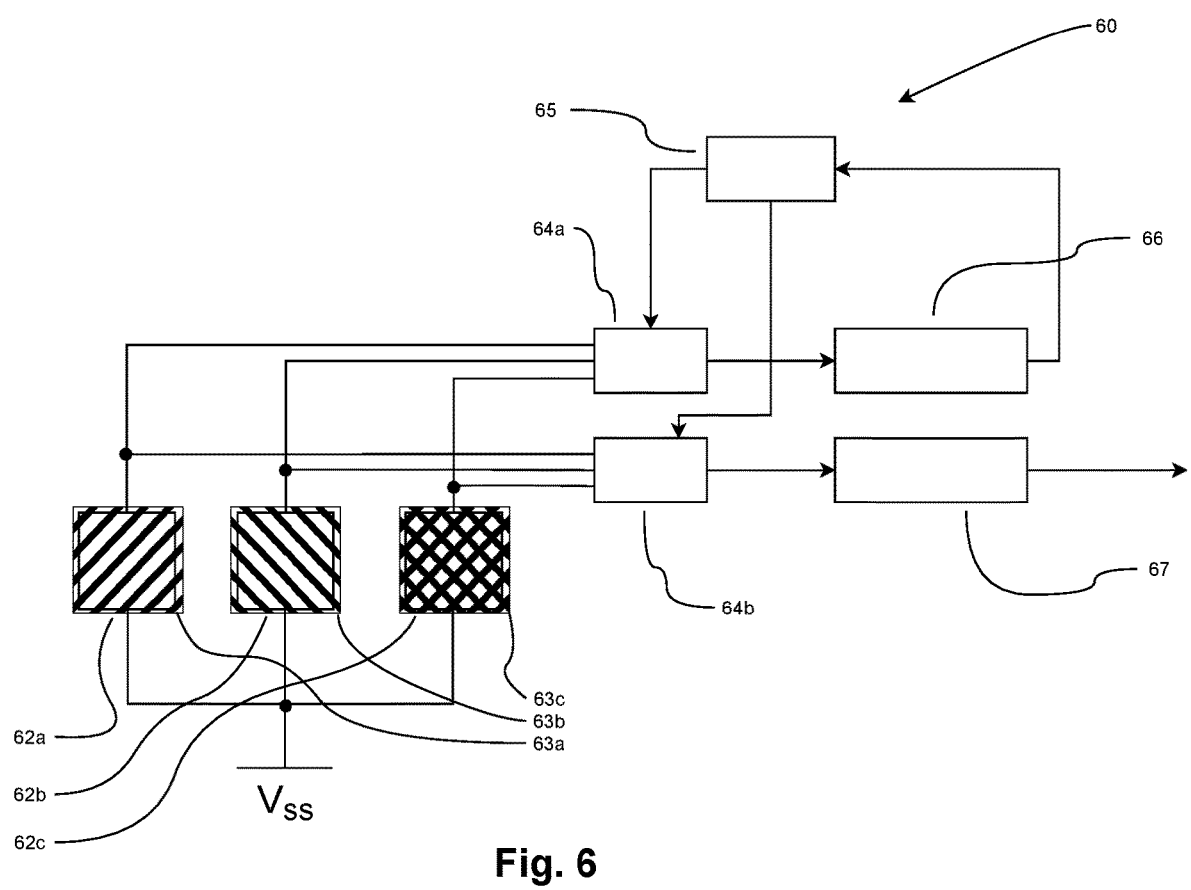
FIG. 6 is a block diagram illustrating the features of a receiver according to an embodiment of the present invention.

FIG. 6 is a block diagram illustrating the features of a receiver 60 according to another embodiment of the present invention.

The receiver 60 comprises first one or more photodetectors 62*a*, second one or more photodetectors 62*b*, and third one or more photodetectors 62*c*. The first one or more photodetectors 62*a* define a first detection area which can receive light; the second one or more photodetectors 62*b* define a second detection area which can receive light; and the third one or more photodetectors 62*c* define a third detection area which can receive light. Importantly, the first one or more photodetectors 62*a* each comprise a first bandpass filter 63*a* which is configured to filter light within a first wavelength range; the second one or more photodetectors 62*b* each comprise a second bandpass filter 63*b* which is configured to filter light within a second wavelength range which is different to the first wavelength range; and the third one or more photodetectors 62*c* each comprise a third bandpass filter 63*c* which is configured to filter light within a third wavelength range which is different to the first and second wavelength ranges.

In one embodiment the first, second and third detection areas are equal in size. In the most preferred embodiment the first, second and third detection areas are each defined by a respective array of photodetectors; and each array is equal in size. In another embodiment the second detection area is larger than the first detection area, and the third detection area is larger than the second detection area.

In this embodiment the receiver 60 further comprises a controller 65, and a first multiplexer 64*a* and a second multiplexer 64*b*. The controller is connected to each of the first and second multiplexers 64*a*,64*b*.

The first multiplexer 64*a* is connected between the first one or more photodetectors 62*a*, second one or more photodetectors 62*b*, and third one or more photodetectors 62*c* and a signal detector module 66. The signal detector has as an input the amplified analog signal from the receptors, and generates an output that encodes a quality factor of the received signal, based on a specified metric. One such metric is for example the peak-to-peak amplitude of a time-varying signal. Another metric is the signal-to-noise ratio of the signal. Another metric is the bit-error rate of the decoded signal, compared to a known reference bit sequence. Another metric is packet loss, which is determined by determining if a packet contains errors based on an error detection scheme such as checksums or cyclic redundancy checks, and by using sequential numbering of packets to determine if some packets are missing due to inability to receive and decode them correctly. The signal detector is configured such that a low output represents a poor signal quality, and a high output represents a good signal quality. Good signal quality is defined as a signal that maximises the probability of correctly decoding the signal into a message that is equal to the message sent by the transmitter.

The controller 65 is configured to operate the first multiplexer 64*a* so that the first multiplexer 64*a* connects any one or more of the first, second, and/or third photodetectors 62*a*,62*b*,62*c* to the signal detector module 66. The first multiplexer 64*a* thus effectively defines an electrically controllable switch which is controllable by the controller 65 to connect any one or more of the first, second, and/or third one or more photodetectors 62*a*,62*b*,62*c* to the signal detector module 66.

The second multiplexer 64*b* is connected between the first one or more photodetectors 62*a*, second one or more photodetectors 62*b*, and third one or more photodetectors 62*c* and a decoder 67. The decoder has as an input the amplified analog signal from the receptor, and generates as an output a sequence of bits that represent a message. In one embodiment, a message is encoded as a sequence of pulses of light, where each pulse has constant length, and pulses are sent within regular, constant intervals of time, and the presence of a pulse within a given interval represents a binary '1' of the message, and the absence of a pulse within a given interval represents a binary '0' of the message. The decoder takes a measurement of the input signal voltage at regular intervals. It compares the analog input signal voltage with a reference voltage. If the input signal voltage is higher than the reference voltage, the decoder generates an output of a binary '1', if the signal voltage is lower than the reference voltage, the decoder generates an output of a binary '0'. Other embodiments are possible that use different symbol representations and modulations to represent the message, and decode the signal.

The controller 65 is configured to operate the second multiplexer 64*b* so that the second multiplexer 64*b* connects any one or more of the first, second, and/or third photodetectors 62*a*,62*b*,62*c* to the decoder 67. The second multiplexer 64*b* thus effectively defines an electrically controllable switch which is controllable by the controller 65 to connect any one or more of the first, second, and/or third photodetectors 62*a*,62*b*,62*c* to the decoder 67.

The controller 65 is configured to control the first multiplexer 64*a* so that the first multiplexer 64*a* connects either the first, second, or third one or more photodetectors 62*a*, 62*b*,62*c* to the signal detector module 66, depending on the wavelength of the signal which is to be transmitted by a transmitter to the receiver. For example, the first bandpass filter 63*a* may be configured to filter light within a first wavelength range of 550 nm-500 nm; the second bandpass filter 63*b* may be configured to filter light within a second wavelength range of 500 nm-430 nm; and the third bandpass filter 63*c* may be configured to filter light within a third wavelength range of 430 nm-380 nm; if a transmitter is transmitting a signal to the receiver 60, and that signal has a frequency in the range 400 nm-410 nm then the controller 65 will control the first multiplexer 64*a* so that the first multiplexer 64*a* connects the third one or more photodetectors 62*c* to the signal detector module 66. In this way the receiver 60 will receive the transmitted signal at the third one or more photodetectors 62*c*, and the third bandpass filter 63*c* will serve to filter the transmitted signal from ambient light, thus reducing noise in the signal which is passed from the third one or more photodetectors 62*c* to the detector module 66. It should be understood that the transmitter may transmit a pulsed, coded signal using different LEDs or laser emitters (a different one for each wavelength range); the transmitter may transmit signal using only one emitter at a time, or multiple emitters simultaneously. The receiver controller can switch between different filtered receptors and compare the relative signal quality, to pick the best one. The measured signal quality may be influenced by the medium (water) through which the signal is transmitted, e.g. clear water is more transmissive to blue and UV wavelengths, while turbid water is more transmissive to green wavelengths and absorbs more blue. The signal quality can also be influenced by ambient light (sunlight, other unrelated LED light sources, e.g. artificial illumination for video cameras, etc.); in this case, for example, the receiver may select the photodetectors which can pass a wavelength range that is different from the ambient light, to effectively filter out ambient light and increase the signal-to-noise ratio. Importantly, the receiver does not require any apriori knowledge about the exact nature of water turbidity or ambient light conditions, as it will simply compare a quality metric between different receptors and pick the one with the highest value of the metric.

However, in most cases the frequency of the signal which is transmitted by the transmitter to the receiver 60 changes over the course of the transmission; this means that one of the first, second, or third one or more photodetectors 62a, 62b, 62c may be optimum to receive one part of the transmitted signal and, if the frequency of the signal which is transmitted changes another one of the first, second, or third one or more photodetectors 62a, 62b, 62c may be optimal to receive another part of the transmitted signal. The controller 65 is configured to determine which of the first, second, or third one or more photodetectors 62a, 62b, 62c the second multiplexer 64b should connect to the signal decoder module 67 at any one time: To do this the controller 65 is configured to evaluate respective "quality factors", which have been determined by the signal detector 66, which are representative of the quality of the respective signals which output from the respective first, second, or third one or more photodetectors 62a, 62b, 62c (and thus is representative of the quality of the respective signal received by the respective first, second, or third one or more photodetectors 62a, 62b, 62c)—the controller 65 first controls the first multiplexer 64a to sequentially connect varying subsets of photodetectors 62a, 62b, 62c to the signal detector 66; the signal detector module 66 determines a "quality factor" for each of the respective output signals from the first, second, or third one or more photodetectors 62a, 62b, 62c to the signal detector 66; the signal detector module 66 passes said determined "quality factors" to the controller 65; the controller 65 then compares the "quality factors", and then configures the second multiplexer 64b so that it connects one or more of the first, second, or third one or more photodetectors 62a, 62b, 62c to the signal decoder 67 whose output signal produced the highest "quality factor".

For example, after the transmitter has begun transmitting a signal to the receiver 60, the controller 65 may control the first multiplexer 64a so that the first multiplexer 64a connects the first one or more photodetectors 62a to the signal detector module 66, and may control the second multiplexer 64b so that the second multiplexer 64b also connects the first one or more photodetectors 62a to the signal decoder module 67. The signal detector module 66 will determine a first quality factor, which is representative of the quality of a signal output from the the first one or more photodetectors 62a (and thus is representative of the quality of the respective signal received by the first one or more photodetectors 62a), and the first quality factor will be sent to the controller. The controller 65 will store that first quality factor in a memory.

While the second multiplexer 64b connects the first one or more photodetectors 62a to the signal decoder module 67, the controller 65 will control the first multiplexer 64a so that the first multiplexer 64a connects the second one or more photodetectors 62b to the signal detector 66. The signal detector module 66 will determine a second quality factor which is representative of the quality of a signal which is output from the second one or more photodetectors 62b. The second quality factor will be sent to the controller 65. The controller 65 is configured to compare the second quality factor with the first quality factor which is stored in memory, and if the second quality factor indicates that the quality of the signal which is output from the second one or more photodetectors 62b is better than the quality of the signal which is output from the first one or more photodetectors 62a, then the controller 65 will control the second multiplexer 64b so that the second multiplexer 64b connects the second one or more photodetectors 62b to the signal decoder module 67. The controller 65 will store that second quality factor in a memory.

If the second quality factor indicates that the quality of the signal which is output from the second one or more photodetectors 62b is worse than the quality of the signal which is output from the first one or more photodetectors 62a to the signal detector module 66, then the controller 65 will leave the second multiplexer 64b unchanged so that the second multiplexer 64b connects the first one or more photodetectors 62a to the signal decoder module 67. In this case the second quality factor is not stored memory. In the preferred embodiment only the highest quality factor is stored in memory.

While the second multiplexer 64b connects either first or second one or more photodetectors 62a, 62b to the signal decoder module 67, the controller 65 will then control the first multiplexer 64a so that the first multiplexer 64a connects the third one or more photodetectors 62c to the signal detector 66.

The signal detector module 66 will then determine a third quality factor which is representative of the quality of a signal which is output from the third one or more photodetectors 62c. The third quality factor will be sent from the signal detector module 66 to the controller 65. The controller 65 is configured to compare the third quality factor with the quality factor which was most recently stored in the memory (which will be either the first or second quality factor depending on the output of the aforementioned steps), and if the third quality factor indicates that the quality of the signal which is output from the third one or more photodetectors 62c is better than the quality of the signal which is currently being output from the first or second one or more photodetectors 62a, 62b to the signal decoder module 67, then the controller 65 will control the second multiplexer 64b so that the second multiplexer 64b connects the third one or more photodetectors 62c to the signal decoder module 67. The controller 65 will store that third quality factor in a memory.

If the third quality factor indicates that the quality of the signal which is output from the third one or more photodetectors 62c is worse than the quality of the signal which is output from the first or second one or more photodetectors 62a, 62b, then the controller 65 will leave the second multiplexer 64b unchanged. In this case the third quality factor is not stored memory.

At this point, depending on the outcome of the aforementioned steps the second multiplexer 64b connects one of either the first or second or third one or more photodetectors 62a,62b,62c to the signal decoder module 67.

The controller 65 will repeat the above-mentioned steps so as to ensure that the photodetectors 62a,62b,62c which have the best quality signal output are always connected to the signal decoder 67 at any one time when the receiver 60 is receiving a signal.

Figure 7:
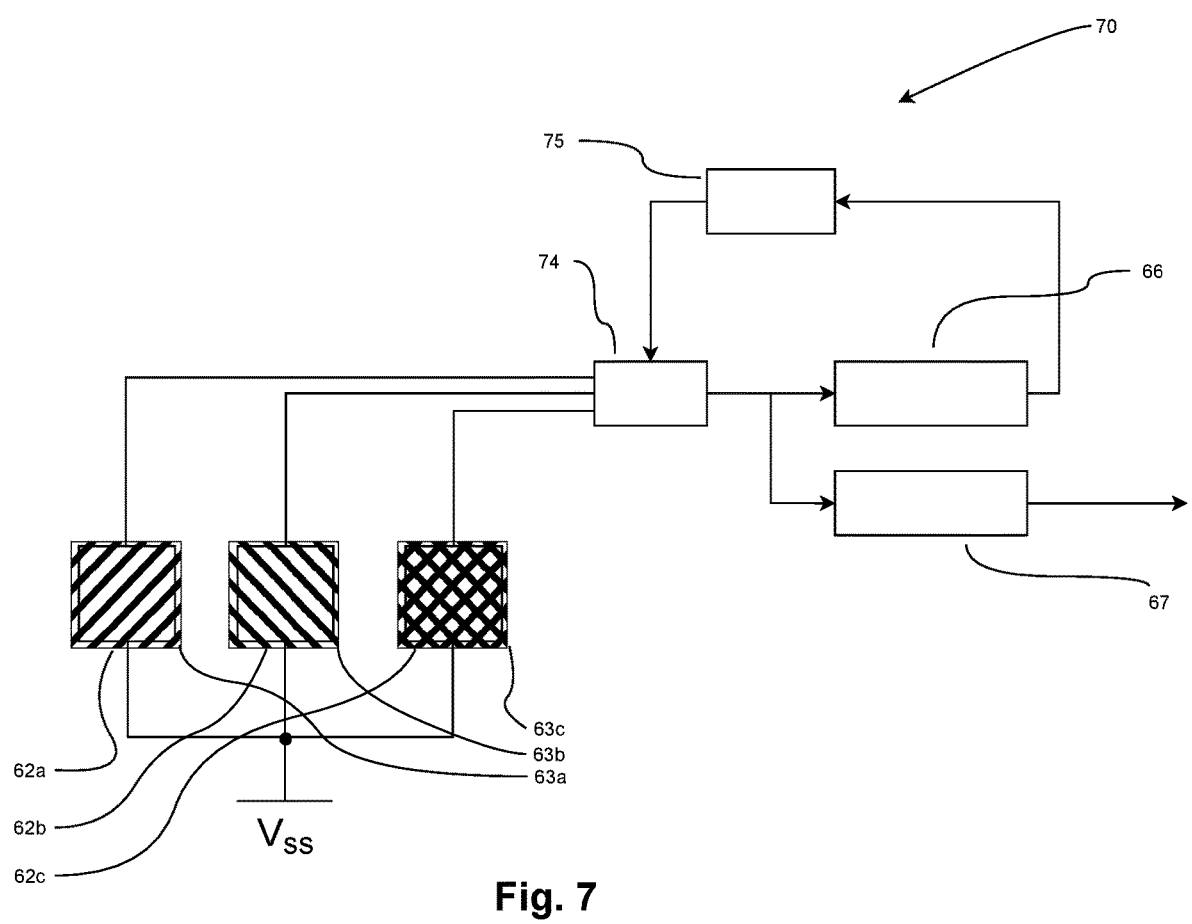
FIG. 7 is a block diagram illustrating the features of a receiver according to an embodiment of the present invention.

FIG. 7 is a block diagram illustrating the features of a receiver 70 according to another embodiment of the present invention. The receiver 70 is a more simple embodiment than the receiver embodiment 60 shown in FIG. 6.

The receiver 70 comprises many of the same features as the receiver 60 in FIG. 6 and like features are awarded the same reference numbers.

In this embodiment the receiver 70 comprises a single multiplexer 74 and a controller 75 which is connected to the single multiplexer 74.

The multiplexer 74 is connected between the first one or more photodetectors 62a, second one or more photodetectors 62b, and third one or more photodetectors 62c and a signal detector module 66 and a signal decoder module 67. The controller 75 is configured to operate the multiplexer 74 so that multiplexer 74 a connects any one or more of the first, second, and/or third photodetectors 62a,62b,62c to the signal detector module 66, and/or to the signal decoder module 67. The multiplexer 74 thus effectively defines an electrically controllable switch which is controllable by the controller 75 to connect any one or more of the first, second, and/or third one or more photodetectors 62a,62b,62c to the signal detector module 66 and/or to the signal decoder module 67.

The controller 75 is configured to control the multiplexer 74 so that the multiplexer 74 connects either the first, second, or third one or more photodetectors 62a,62b,62c to the signal detector module 66, depending on the wavelength of the signal which is to be transmitted by a transmitter to the receiver. For example, the first bandpass filter 63a may be configured to filter light within a first wavelength range of 550 nm-500 nm; the second bandpass filter 63b may be configured to filter light within a second wavelength range of 500 nm-430 nm; and the third bandpass filter 63c may be configured to filter light within a third wavelength range of 430 nm-380 nm; if a transmitter is transmitting a signal to the receiver 70, and that signal has a frequency in the range 400 nm-410 nm then the controller 75 will control the multiplexer 74 so that the multiplexer 74 connects the third one or more photodetectors 62c to the signal detector module 66 and signal decoder module 67. In this way the receiver 70 will receive the transmitted signal at the third one or more photodetectors 62c, and the third bandpass filter 63c will serve to filter the transmitted signal from ambient light, thus reducing noise in the signal which is passed from the third one or more photodetectors 62c to the decoder module 67. It should be understood that the transmitter may transmit a pulsed, coded signal using different LEDs or laser emitters (a different one for each wavelength range); the transmitter may transmit a signal using only one emitter at a time, or multiple emitters simultaneously. The receiver controller can switch between different filtered receptors and compare the relative signal quality, to pick the best one. The measured signal quality may be influenced by the medium (water) through which the signal is transmitted, e.g. clear water is more transmissive to blue and UV wavelengths, while turbid water is more transmissive to green wavelengths and absorbs more blue. The signal quality can also be influenced by ambient light (sunlight, other unrelated LED light sources, e.g. artificial illumination for video cameras, etc.); in this case, for example, the receiver may select the photodetectors which can pass a wavelength range that is different from the ambient light, to effectively filter out ambient light and increase the signal-to-noise ratio. Importantly, the receiver does not require any apriori knowledge about the exact nature of water turbidity or ambient light conditions, as it will simply compare a quality metric between different receptors and pick the one with the highest value of the metric.

However, in most cases the wavelength of the signal which is transmitted by the transmitter to the receiver is unknown. The controller 75 is configured to determine which of the first, second, or third one or more photodetectors 62a,62b,62c the multiplexer 74 should connect to the signal decoder module 67: The signal detector module 66 determines respective "quality factors" which is representative of the quality of the respective signals output from the first, second, or third one or more photodetectors 62a,62b, 62c; the controller 75 is configured receives the "quality factors". The controller 75 compares the respective "quality factors" which is receives from the signal detector module 66; and the controller 75 then controls the multiplexer 74 so that it connects the photodetectors whose output signal has the highest quality factor to the signal decoder module 67.

For example, after the transmitter has begun transmitting a signal to the receiver 70, the controller 75 will first control the multiplexer 74 so that the multiplexer 74 connects the first one or more photodetectors 62a to the signal detector module 66. The signal detector module 66 will determine a first quality factor which is representative of the quality of a signal which is output from the first one or more photodetectors 62a; and the first quality factor will be passed to the controller 75. The controller 75 will store that first quality factor in a memory.

The controller 75 will then control the multiplexer 74 so that the multiplexer 74 connects the second one or more photodetectors 62b to the signal detector module 66. The signal detector module 66 will determine a second quality factor which is representative of the quality of a signal which is output from the second one or more photodetectors 62b; and the second quality factor will be passed to the controller 75. The controller 75 will store that second quality factor in a memory.

The controller 75 will then control the multiplexer 74 so that the multiplexer 74 connects the third one or more photodetectors 62c to the signal detector module 66. The controller 75 will determine a third quality factor which is representative of the quality of a signal which is output from the third one or more photodetectors 62c. The signal detector module 66 will determine a third quality factor which is representative of the quality of a signal which is output from the third one or more photodetectors 62c; and the third quality factor will be passed to the controller 75. The controller 75 will store that third quality factor in a memory.

The controller 75 will then compare the first, second and third quality factors, which have been stored in memory, to identify which of the first, second and third quality factors, is the highest. If the quality factor corresponding to the first one or more photodetectors 62a is the highest, the controller will then configure the multiplexer 74 so that the multiplexer 74 connects the first one or more photodetectors 62a to the signal decoder module 67. If the quality factor corresponding to the second one or more photodetectors 62b is the highest, the controller will then configure the multiplexer 74 so that the multiplexer 74 connects the second one or more photodetectors 62b to the signal decoder module 67. If the quality factor corresponding to the third photodetectors 62c is the highest, the controller will then configure the multiplexer 74 so that the multiplexer 74 connects the third one or more photodetectors 62c to the signal decoder module 67.

In the preferred embodiment, once the controller 75 has identified, based on the quality factor, which of the first, second, or third one or more photodetectors 62a,62b,62c the multiplexer 74 should connect to the signal decoder module 67, the multiplexer 74 will remain in that state for the duration the receiver 70 is receiving the transmitted signal. This is in contrast to the receiver 60 in FIG. 60 in which the state of the first multiplexer 64a can be changed dynamically so that the first, second, or third one or more photodetectors 62a,62b,62c can be connected to the signal detector module 66 at different times to continue determining which of the photodetectors 62a,62b,62c produces the highest quality factor, while the receiver 60 is receiving the transmitted signal and can decode the signal without interruption with signal decoder 67 that is connected to one or more photodetectors 62a,62b,62c via multiplexer 64b.

Figure 8:
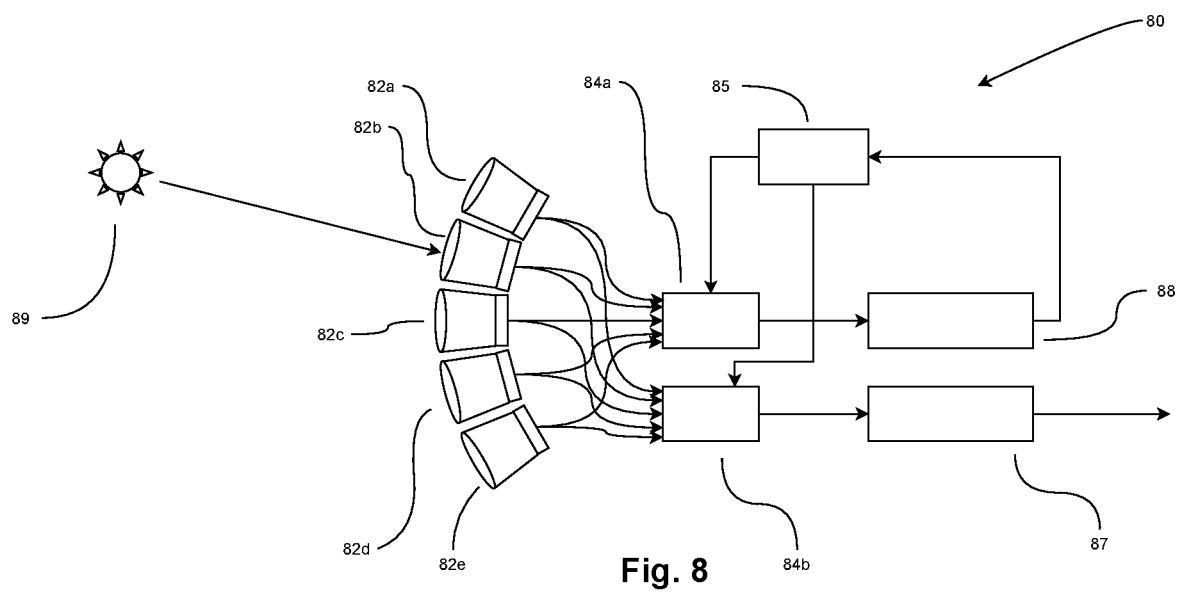
FIG. 8 is a block diagram illustrating the features of a receiver according to an embodiment of the present invention.

FIG. 8 is a block diagram illustrating the features of a receiver 80 according to another embodiment of the present invention.

The receiver 80 comprises first one or more photodetectors 82a, second one or more photodetectors 82b, and third one or more photodetectors 82c. The first one or more photodetectors 82a define a first detection area which can receive light; the second one or more photodetectors 82b define a second detection area which can receive light; and the third one or more photodetectors 82c define a third detection area which can receive light. Importantly, the first one or more photodetectors 82a are configured to receive light from a first direction only; the second one or more photodetectors 82b are configured to receive light from a second direction only which is different to the first direction; and the third one or more photodetectors 82c are configured to receive light from a third direction only which is different to the first and second directions.

It should be understood that the first one or more photodetectors 82a, second one or more photodetectors 82b, and third one or more photodetectors 82c may be configured to receive light from their respective different directions using any suitable means.

Figure 9A:
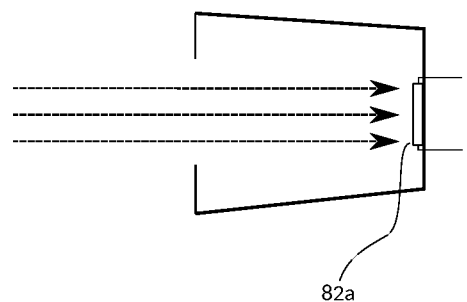
FIG. 9 shows different possible features of the photodetectors used in the assembly of FIG. 8, which can be used to configure the photodetectors to receive light in different predefined directions.

For example, the photodetectors may each have a housing with a pin-hole opening as shown in FIG. 9a. The first one or more photodetectors 82a may be orientated so that the pin-hole opening is facing in the first direction so that the first one or more photodetectors 82a receive light from the first direction only through the pin-hole; the second one or more photodetectors 82b may be orientated so that the pin-hole opening is facing in the second direction so that the second one or more photodetectors 82a receive light from the second direction only through the pin-hole; the third one or more photodetectors 82c may be orientated so that the pin-hole opening is facing in the third direction so that the third one or more photodetectors 82c receive light from the third direction only through the pin-hole.

Figure 9B:
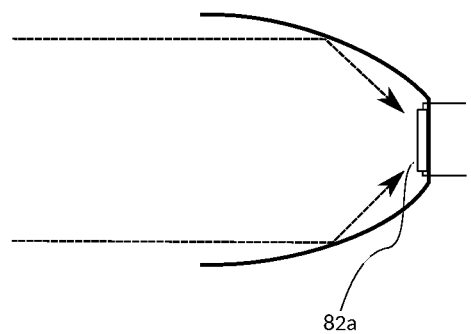

In another example the photodetectors may have a reflective cone as shown in FIG. 9b; the reflective cone is configured to focus light, which is incident in one direction on the photodetector is focused onto a single photoreceiver of the photodetector, while light which is incident in other directions on the photodetector is reflected away from the photoreceiver of the photodetector. The reflective cones of the photodetectors belonging to the first one or more photodetectors 82a may be orientated so that the respective cones focus light, which is incident said first direction only, is focused onto a photoreceiver of the respective photodetectors belonging to the first one or more photodetectors 82a, while light which is incident in other directions on the photodetectors is reflected away; the reflective cones of the photodetectors belonging to the second one or more photodetectors 82b may be orientated so that the respective cones focus light, which is incident in said second direction only, is focused onto the photoreceiver of the respective photodetectors belonging to the second one or more photodetectors 82b, while light which is incident in other directions on the photodetectors is reflected away; the reflective cones of the photodetectors belonging to the third one or more photodetectors 82c may be orientated so that the respective cones focus light, which is incident in said third direction only, is focused onto a photoreceiver of the respective photodetectors belonging to the third one or more photodetectors 82c, while light which is incident in other directions on the photodetectors is reflected away.

Figure 9C:
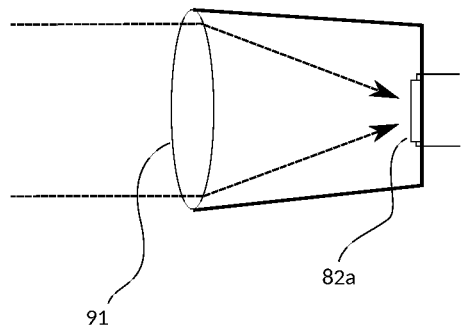

In another example the photodetectors may have a lens 91 (which is typically convex, and is typically made from glass or clear plastics) as shown in FIG. 9c; the lens 91 is configured to focus light, which is incident on the photodetector, onto a single photoreceiver 92 of the photodetector. The lenses 91 of the photodetectors belonging to the respective first one or more photodetectors 82a may be orientated so that the lenses 91 focus only the light which is incident in said first direction onto the respective single photoreceiver(s) belonging to the first one or more photodetectors 82a; light which is incident on the first one or more photodetectors 82a in a direction other than said first direction is not passed by the lenses 91 to the respective single photoreceiver(s) belonging to the first one or more photodetectors 82a. The lenses 91 of the photodetectors belonging to the respective second one or more photodetectors 82b may be orientated so that the lenses focus only the light, which is incident in said second direction onto the respective single photoreceiver(s) belonging to the second one or more photodetectors 82b; light which is incident on the second one or more photodetectors 82b in a direction other than said second direction is not passed by the lenses 91 to the respective single photoreceiver(s) belonging to the second one or more photodetectors 82a. The lenses 91 of the photodetectors belonging to the respective belonging to the third one or more photodetectors 82c may be orientated so that the lenses 91 focus light, which is incident in said third direction only onto the respective single photoreceiver(s) belonging to the third one or more photodetectors 82c; light which is incident on the third one or more photodetectors 82c in a direction other than said third direction is not passed by the lenses 91 to the respective single photoreceiver(s) belonging to the second one or more photodetectors 82a.

Figure 9D:
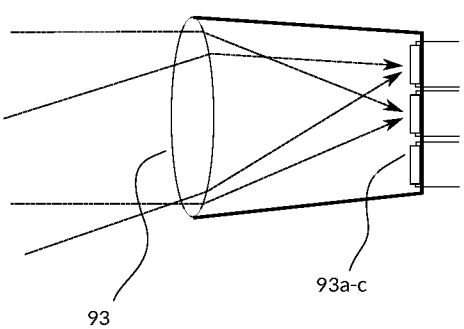

In another example the photodetectors may have a lens 91 (which is typically convex, and it typically made from glass or clear plastics) as shown in FIG. 9d; the lens 93 is configured to focus light, which is incident on the photodetector, onto an array of photoreceivers 93 of the photodetector. The lens 93 is configured to focus light on a photoreceiver in the array 93 depending on the direction that light is incident on the photodetector. For example light which is incident in a first direction onto the photodetector may be focused by the lens 93 onto a first photoreceiver 93a of the photodetector; light which is incident in a second direction onto the photodetector may be focused by the lens 93 onto a second photoreceiver 93b of the photodetector; light which is incident in a third direction onto the photodetector may be focused by the lens 93 onto a third photoreceiver 93c of the photodetector. In one embodiment photoreceivers 93a-c within the array are selected, depending on the direction which a signal of interest has been incident on the photodetector, and only the outputs of those selected photoreceivers are sent to the signal detector module 66 and/or decoder 67. For example if the signal which is transmitted to the receiver is incident in a first direction on the photodetector then only the outputs of those photoreceivers which have lenses which are configured to focus light which is incident in a first direction onto the photodetector, are sent to the signal detector module 66 and/or decoder 67.

It should be understood that in variation of the present invention the receiver comprises only one single detector area defined by a one or more photodetectors; and that single detector area comprises a lens and an array of photoreceivers; wherein the lens is configured to focus only light, which is incident in a first direction onto the single detector area, onto predefined photoreceivers in the array of photoreceivers, and to focus only light, which is incident in a second direction onto the single detector area, onto other predefined photoreceivers in the array.

In one embodiment the first, second and third detection areas are equal in size. In the most preferred embodiment the first, second and third detection areas are each defined by a respective array of photodetectors; and each array is equal in size. In another embodiment the second detection area is larger than the first detection area, and the third detection area is larger than the second detection area.

In this embodiment the receiver 80 further comprises a controller 85, and a first multiplexer 84a and a second multiplexer 84b. The controller 85 is connected to each of the first and second multiplexers 84a,84b.

The first multiplexer 84a is connected between the first one or more photodetectors 82a, second one or more photodetectors 82b, and third one or more photodetectors 82c and a signal detector module 88. The controller 85 is configured to operate the first multiplexer 84a so that the first multiplexer 84a connects any one or more of the first, second, and/or third photodetectors 82a,82b,82c to the signal detector module 88. The first multiplexer 84a thus effectively defines an electrically controllable switch which is controllable by the controller 85 to connect any one or more of the first, second, and/or third one or more photodetectors 82a,82b,82c to the signal detector module 88.

The second multiplexer 84b is connected between the first one or more photodetectors 82a, second one or more photodetectors 82b, and third one or more photodetectors 82c and a decoder 87. The controller 85 is configured to operate the second multiplexer 84b so that the second multiplexer 84b connects any one or more of the first, second, and/or third photodetectors 82a,82b,82c to the decoder 87. The second multiplexer 84b thus effectively defines an electrically controllable switch which is controllable by the controller 85 to connect any one or more of the first, second, and/or third photodetectors 82a,82b,82c to the decoder 87.

The controller 85 is configured to control the first multiplexer 84a so that the first multiplexer 84a connects either the first, second, or third one or more photodetectors 82a, 82b,82c to the signal detector module 88, depending on the direction which a transmitted signal (which has been transmitted by a transmitter) is incident on the receiver 80.

For example, if a transmitter is transmitting a signal to the receiver 80, and that signal is incident in the first direction on the receiver 80 then the controller 85 will control the second multiplexer 84b so that the second multiplexer 84b connects the first one or more photodetectors 82a to the signal decoder module 87. In this way the receiver 80 will receive the transmitted signal at the first one or more photodetectors 82a, and any signals incident from directions other than the first direction will not be received, thus reducing noise in the signal which is passed from the third one or more photodetectors 82a to the decoder module 87. Likewise, if a transmitter is transmitting a signal to the receiver 80, and that signal is incident in the second direction on the receiver 80 then the controller 85 will control the second multiplexer 84b so that the second multiplexer 84b connects the second one or more photodetectors 82b to the signal decoder module 87; and if a transmitter is transmitting a signal to the receiver 80, and that signal is incident in the third direction on the receiver 80 then the controller 85 will control the second multiplexer 84b so that the second multiplexer 84b connects the third one or more photodetectors 82b to the signal decoder module 88.

However, in most cases the direction of the signal which is transmitted by the transmitter to the receiver 80 changes over the course of the transmission—this can particularly be the case if the transmitter or the receiver 80 is moving as the signal is being transmitted; this means that one of the first, second, or third one or more photodetectors 82a,82b,82c may be optimum to receive one part of the transmitted signal and, if the direction of the signal which is transmitted changes (e.g. due to the position of the transmitter or receiver 80 changing) then another one of the first, second, or third one or more photodetectors 82a,82b,82c may be optimum to receive another part of the transmitted signal. The controller 85 is configured to determine which of the first, second, or third one or more photodetectors 82a,82b, 82c the second multiplexer 84b should connect to the signal decoder module 87 at any one time: To do this the signal detector module 88 is configured to determine a respective "quality factor" which is representative of the quality of the respective signal which is output from the first, second, or third one or more photodetectors 82a,82b,82c; the respective "quality factors" are passed to from the signal detector module 88 to the controller 85; the controller 85 then controls the second multiplexer 84b so that it connects the photodetectors whose output signal had the highest quality factor.

For example, after transmitter has begun transmitting a signal to the receiver 80, the controller 85 may control the first multiplexer 84a so that the first multiplexer 84a connects the first one or more photodetectors 82a to the signal detector module 88. The signal detector module 88 will determine a first quality factor which is representative of the quality of a signal which is output from the first one or more photodetectors 82a to the signal detector module 88; and the first quality factor will be passed to the controller 85. The controller 85 will store that first quality factor in a memory.

The controller 85 will configure the second multiplexer 84b so that it connects the first one or more photodetectors 82a to the signal decoder module 87. While the second multiplexer 84b connects the first one or more photodetectors 82a to the signal decoder module 87, the controller 85 will control the first multiplexer 84a so that the first multiplexer 84a connects the second one or more photodetectors 82b to the signal detector module 88. The signal detector module 88 will determine a second quality factor which is representative of the quality of a signal which is output from the second one or more photodetectors 82b to the signal detector module 88. The second quality factor will be passed to the controller 85. The controller 85 is configured to compare the second quality factor with the first quality factor which is stored in memory, and if the second quality factor indicates that the quality of the signal which is output from the second one or more photodetectors 82*b* to the signal detector 88 is better than the quality of the signal which is output from the first one or more photodetectors 82*a* to the signal detector module 88, then the controller 85 will control the second multiplexer 84*b* so that the second multiplexer 84*b* connects the second one or more photodetectors 82*b* to the signal decoder module 87. The controller 85 will store that second quality factor in a memory.

If the second quality factor indicates that the quality of the signal which is output from the second one or more photodetectors 82*b* to the signal detector 88 is worse than the quality of the signal which is output from the first one or more photodetectors 82*a* to the signal detector module 88, then the controller 85 will leave the second multiplexer 84*b* unchanged so that the second multiplexer 84*b* connects the first one or more photodetectors 82*a* to the signal decoder module 87. In this case the second quality factor is not stored memory. In the preferred embodiment only the highest quality factor of the signal is stored in memory only.

At this point, depending on the outcome of the aforementioned steps the second multiplexer 84*b* connects one of either the first or second one or more photodetectors 82*a*,82*b* to the signal decoder module 88.

While the second multiplexer 84*b* connects either first or second one or more photodetectors 82*a*,82*b* to the signal decoder module 87, the controller 85 will then control the first multiplexer 84*a* so that the first multiplexer 84*a* connects the third one or more photodetectors 82*c* to the signal detector module 88.

The signal detector module 88 will then determine a third quality factor which is representative of the quality of a signal which is output from the third one or more photodetectors 82*c* to the signal detector 88. The third quality factor will be passed from the signal detector module 88 to the controller 85. The controller 85 is configured to compare the third quality factor with the quality factor which was most recently stored in the memory (which will be either the first or second quality factor depending on the output of the aforementioned steps), and if the third quality factor indicates that the quality of the signal which is output from the third one or more photodetectors 82*c* to the signal detector 88 is better (i.e. is higher) than the quality of the signal which is currently being output from the first or second one or more photodetectors 82*a*,82*b* to the signal decoder module 87, then the controller 85 will control the second multiplexer 84*b* so that the second multiplexer 84*b* connects the third one or more photodetectors 82*c* to the signal decoder module 87. The controller 85 will store that third quality factor in a memory.

If the third quality factor indicates that the quality of the signal which is output from the third one or more photodetectors 82*c* to the signal detector 88 is worse (i.e. is lower) than the quality of the signal which is output from the first or second one or more photodetectors 82*a*,82*b* to the signal decoder module 87, then the controller 85 will leave the first multiplexer 84*a* unchanged. In this case the third quality factor is not stored memory.

At this point, depending on the outcome of the aforementioned steps the first multiplexer 84*a* connects one of either the first or second or third one or more photodetectors 82*a*,82*b*,82*c* to the signal decoder module 87.

The controller 85 will repeat the above-mentioned steps so as to ensure that the photodetectors 82*a*,82*b*,82*c* which have the best quality signal output are always connected to the signal decoder 87 at any one time when the receiver 80 is receiving a signal.

Figure 10:
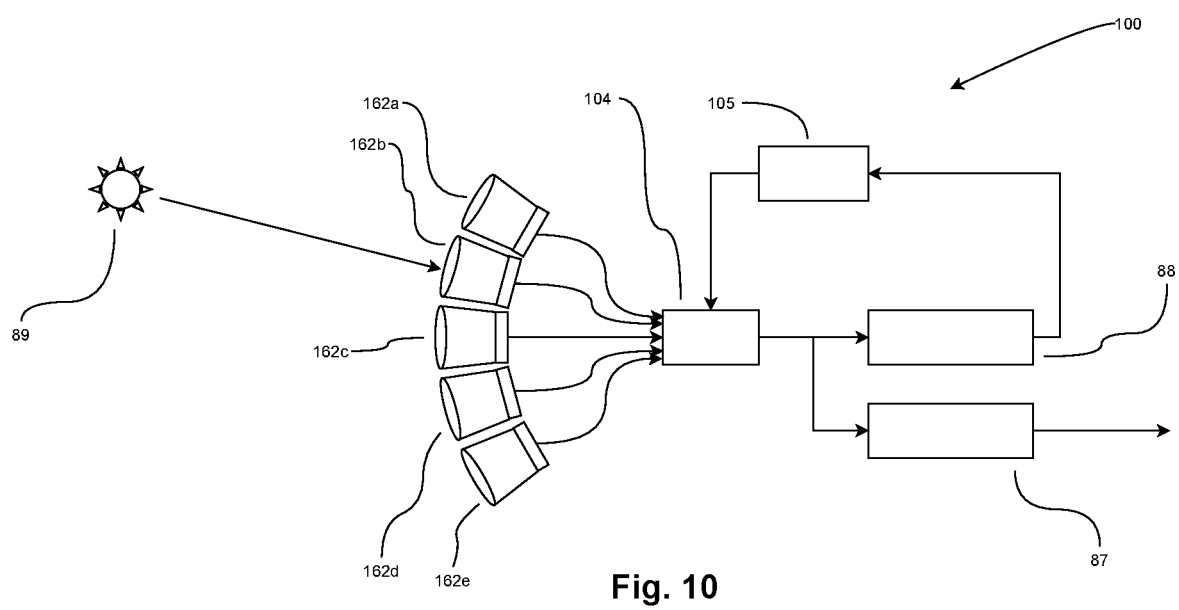
FIG. 10 is a block diagram illustrating the features of a receiver according to an embodiment of the present invention.

FIG. 10 is a block diagram illustrating the features of a receiver 100 according to another embodiment of the present invention. The receiver 100 is a more simple embodiment than the receiver embodiment 80 shown in FIG. 8.

The receiver 100 comprises many of the same features as the receiver 80 in FIG. 8 and like features are awarded the same reference numbers.

In this embodiment the receiver 100 comprises a single multiplexer 104 and a controller 105 which is connected to the single multiplexer 104.

The multiplexer 104 is connected between the first one or more photodetectors 162*a*, second one or more photodetectors 162*b*, and third one or more photodetectors 162*c* and a signal detector module 88 and a signal decoder module 87. The controller 105 is configured to operate the multiplexer 104 so that multiplexer 104 a connects any one or more of the first, second, and/or third photodetectors 162*a*,162*b*, 162*c* to the signal detector module 88 and signal decoder module 87. The multiplexer 104 thus effectively defines an electrically controllable switch which is controllable by the controller 105 to connect any one or more of the first, second, and/or third one or more photodetectors 162*a*,162*b*, 162*c* to the signal detector module 88 and signal decoder module 87.

The controller 105 is configured to control the multiplexer 104 so that the multiplexer 104 connects either the first, second, or third one or more photodetectors 162*a*,162*b*,162*c* to the signal detector module 88 and signal decoder module 87, depending on the direction which a transmitted signal (which has been transmitted by a transmitter) is incident on the receiver 80.

For example, if a transmitter is transmitting a signal to the receiver 100, and that signal is incident in the first direction on the receiver 100 then the controller 105 will control the multiplexer 104 so that it connects the first one or more photodetectors 162*a* to the signal detector module 88 and signal decoder module 87. In this way the receiver 100 will receive the transmitted signal at the first one or more photodetectors 162*a*, and any signals incident from directions other than the first direction will not be received, thus reducing noise in the signal which is passed from the third one or more photodetectors 162*a* to the detector module 88. Likewise, if a transmitter is transmitting a signal to the receiver 100, and that signal is incident in the second direction on the receiver 100 then the controller 105 will control the multiplexer 104 so that the multiplexer 104 connects the second one or more photodetectors 162*b* to the signal detector module 88; and if a transmitter is transmitting a signal to the receiver 100, and that signal is incident in the third direction on the receiver 100 then the controller 85 will control the multiplexer 104 so that the multiplexer 104 connects the third one or more photodetectors 162*b* to the signal detector module 88.

However, in most cases direction which the transmitted signal will be incident on the receiver 100 is usually unknown. The controller 105 is configured to determine which of the first, second, or third one or more photodetectors 162*a*,162*b*,162*c* the multiplexer 104 should connect to the signal detector module 88 and signal decoder module 87: To do this the controller 105 is configured to determine a "quality factor" which is representative of the quality of a signal which is output from the first, second, or third one or more photodetectors 162*a*,162*b*,162*c*—the controller 105 then controls the multiplexer 104 so that it connects the photodetectors whose output signal to the signal detector module 88 has the highest quality factor.

For example, after transmitter has begun transmitting a signal to the receiver 100, the controller 105 will first control the multiplexer 104 so that the multiplexer 104 connects the first one or more photodetectors 162*a* to the signal detector module 88. The controller will determine a first quality factor which is representative of the quality of a signal which is output from the first one or more photodetectors 162*a* to the signal detector module 88. The controller 105 will store that first quality factor in a memory.

The controller 105 will then control the multiplexer 104 so that the multiplexer 104 connects the second one or more photodetectors 162*b* to the signal detector module 88. The controller 105 will determine a second quality factor which is representative of the quality of a signal which is output from the second one or more photodetectors 162*b* to the signal detector module 88. The controller 105 will compare the second quality factor to the first quality factor which is stored in memory, and if the second quality factor indicates that the quality of the signal which is output from the second one or more photodetectors 162*b* to the signal detector module 88 is better than the quality of the signal which is output from the first one or more photodetectors 162*a* to the signal detector module 88, then the controller 105 will control the multiplexer 104 so that the multiplexer 104 connects the second one or more photodetectors 162*b* to the signal detector module 88. The controller 65 will store that second quality factor in a memory. If the second quality factor indicates that the quality of the signal which is output from the second one or more photodetectors 162*b* to the decoder 87 is better than the quality of the signal which is output from the first one or more photodetectors 162*a* to the signal detector module 66, then this means that the transmitted signal is more likely incident in the second direction on the receiver 100.

If the second quality factor indicates that the quality of the signal which is output from the second one or more photodetectors 162*b* to the signal detector module 88 is worse than the quality of the signal which is output from the first one or more photodetectors 162*a* to the signal detector module 88, then the controller 105 will leave the multiplexer 104 unchanged so that the multiplexer 104 connects the first one or more photodetectors 162*a* to the signal detector module 88 and signal decoder module 87. In this case the second quality factor is not stored memory. In the preferred embodiment only the quality factor of the signal which is being output from the one or more photodetectors 162*b* to the signal detector module 88 is stored in memory only. If the second quality factor indicates that the quality of the signal which is output from the second one or more photodetectors 162*b* to the detector 88 is worse than the quality of the signal which is output from the first one or more photodetectors 162*a* to the signal detector module 88, then this means that the transmitted signal is more likely incident in the first direction on the receiver 100.

At this point, depending on the outcome of the aforementioned steps the multiplexer 104 connects one of either the first or second one or more photodetectors 162*a*,162*b* to the signal detector module 66.

The controller 105 will then control the multiplexer 104 so that the multiplexer 104 connects the third one or more photodetectors 162*c* to the signal detector module 88. The controller 105 will determine a third quality factor which is representative of the quality of a signal which is output from the third one or more photodetectors 162*c* to the signal detector module 88. The controller 105 will compare the third quality factor to the quality factor which was most recently stored in memory (which will be either the first quality factor or second quality factor depending on the outcome of the aforementioned steps), and if the third quality factor indicates that the quality of the signal which is output from the third one or more photodetectors 162*c* to the detector 88 is better than the quality of the signal which is currently being output to the signal detector module 88, then the controller 105 will control the multiplexer 104 so that the multiplexer 104 connects the third one or more photodetectors 162*c* to the signal detector module 88 and decoder 87. The controller 105 will store that third quality factor in a memory. If the third quality factor indicates that the quality of the signal which is output from the third one or more photodetectors 162*c* to the detector 88 is better than the quality of the signal which is output from the first or second one or more photodetectors 162*a*, 162*b* to the signal detector module 88, then this means that the transmitted signal is more likely incident in the third direction on the receiver 100.

If the third quality factor indicates that the quality of the signal which is output from the third one or more photodetectors 162*c* to the signal detector module 88 is worse than the quality of the signal which currently being output to the signal detector module 66, then the controller 105 will leave the multiplexer 104 unchanged. In this case the second quality factor is not stored memory. In the preferred embodiment only the quality factor of the signal which is being output from the one or more photodetectors to the signal detector module 88 is stored in memory only.

In the preferred embodiment, once the controller 105 has identified, based on the quality factor, which of the first, second, or third one or more photodetectors 162*a*,162*b*,162*c* the multiplexer 104 should connect to the signal detector module 88 and signal decoder module 87, the multiplexer 104 will remain in that state for the duration the receiver 100 is receiving the transmitted signal. This is in contrast to the receiver 80 in FIG. 8 in which the state of the first multiplexer 64*a* can be changed dynamically so that the first, second, or third one or more photodetectors 82*a*,82*b*,82*c* can be connected to the signal detector module 66 at different times while the receiver 80 is receiving the transmitted signal.

Figure 11:
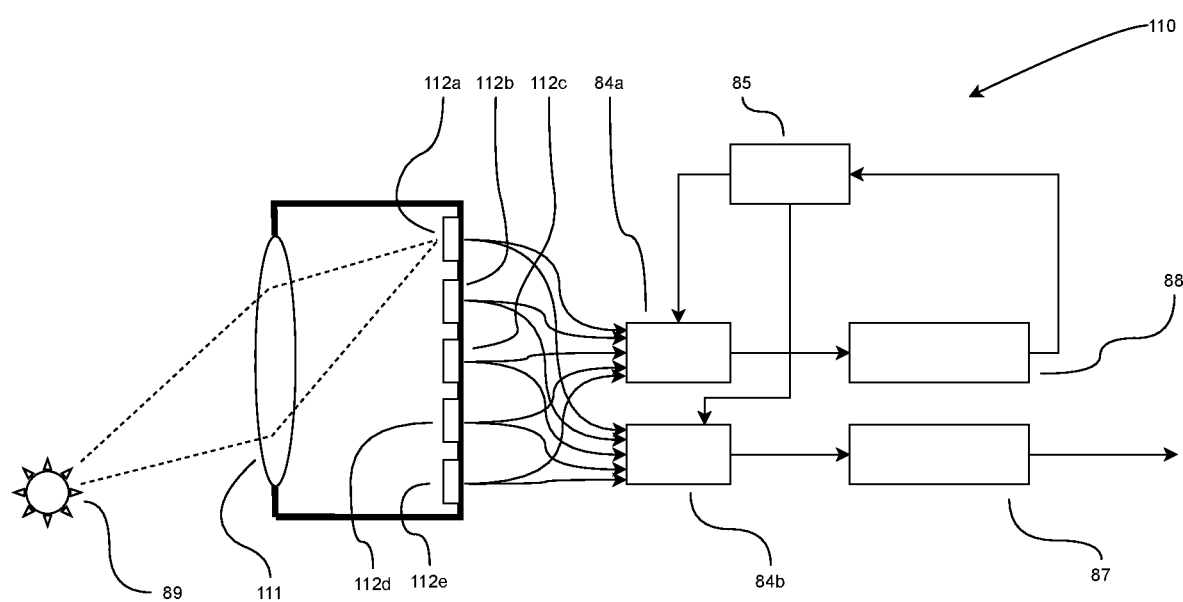

FIG. 11 is a block diagram illustrating the features of a receiver 110 according to another embodiment of the present invention. The receiver 110 has many of the same features as the receiver 80 in FIG. 8 and like features are awarded the same reference numbers.

The receiver 110 comprises a plurality of photodetectors 112*a*-112*e* (each photodetector is defined by a respective photoreceiver 112*a*-112*e*) which are arranged to form an array. Each of the photodetectors 112*a*-112*e* define a respective a respective detection area of the receiver which can receive light. The receiver 110 further comprises a lens 111; the lens 111 is configured to focus light on a photodetector 112*a*-112*e* in the array depending on the direction that light is incident on the receiver 110. For example light which is incident in a first direction onto the receiver 110 is focused by the lens 111 onto a first photodetector 112*a*, as is shown in FIG. 11; light which is incident in a second direction onto the receiver 110 is focused by the lens 111 onto a second first photodetector 112*b*; light which is incident in a third direction onto the receiver 110 is focused by the lens 111 onto a third first photodetector 112*c*; light which is incident in a fourth direction onto the receiver 110 is focused by the lens 111 onto a fourth photodetector 112*d*; light which is incident in a fifth direction onto the receiver 110 is focused by the lens 111 onto a fifth photodetector 112*e*. In the preferred embodiment photodetectors 112*a*-112*e* (each of which is defined by a respective photoreceiver) within the array are selected, depending on the direction which a signal of interest is incident on the receiver, and only the output(s) of the/those selected photodetector(s) 112a-112e are sent to the signal detector module 88 and/or decoder 87. For example, if the signal which is transmitted to the receiver 110 is incident in a first direction on the receiver, and the lens 111 will focus the incident light onto the first photodetector 112a, as is shown in FIG. 11, then only the output of this first photodetector 112a is sent to the signal detector module 88 and/or decoder 87 (via the first multiplexer 84a and/or second multiplexer 84b).

The receiver 110 operates in a similar manner as the receiver 80 in FIG. 8.

Figure 12:
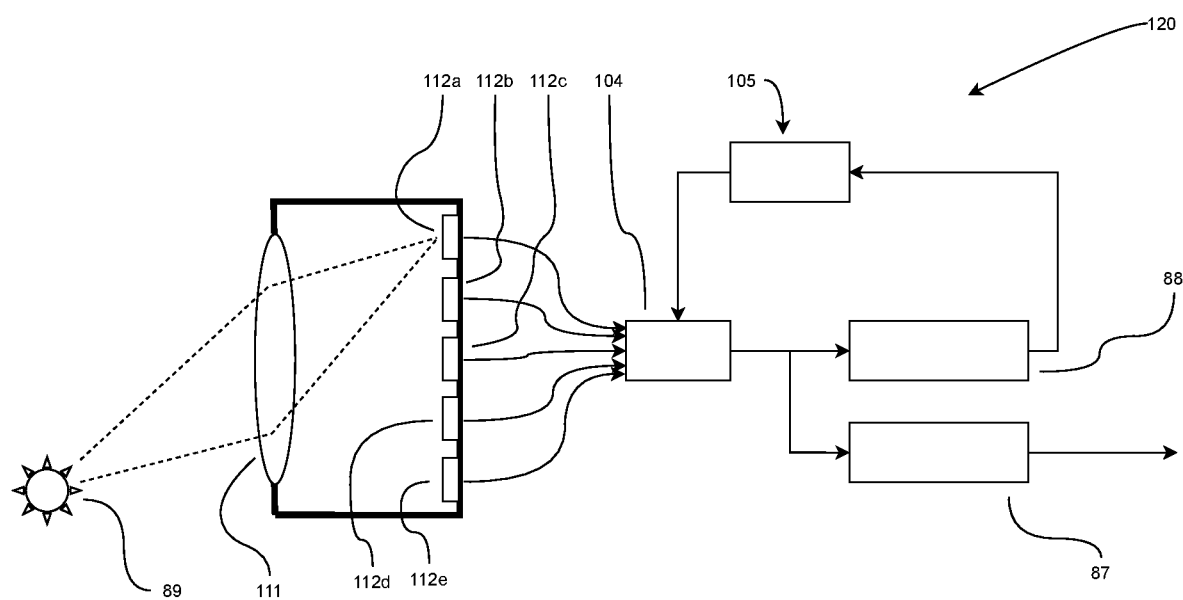

FIG. 12 is a block diagram illustrating the features of a receiver 120 according to another embodiment of the present invention. The receiver 120 has many of the same features as the receiver 100 in FIG. 10 and like features are awarded the same reference numbers.

The receiver 120 comprises a plurality of photodetectors 112a-112e (each photodetector is defined by a respective photoreceiver 112a-112e) which are arranged to form an array. Each of the photodetectors 112a-112e define a respective a respective detection area of the receiver which can receive light. The receiver 120 further comprises a lens 111; the lens 111 is configured to focus light on a photodetector 112a-112e in the array depending on the direction that light is incident on the receiver 120. For example light which is incident in a first direction onto the receiver 120 is focused by the lens 111 onto a first photodetector 112a, as is shown in FIG. 11; light which is incident in a second direction onto the receiver 120 is focused by the lens 111 onto a second first photodetector 112b; light which is incident in a third direction onto the receiver 120 is focused by the lens 111 onto a third first photodetector 112c; light which is incident in a fourth direction onto the receiver 20 is focused by the lens 111 onto a fourth photodetector 112d; light which is incident in a fifth direction onto the receiver 120 is focused by the lens 111 onto a fifth photodetector 112e. In the preferred embodiment photodetectors 112a-112e (each of which is defined by a respective photoreceiver) within the array are selected, depending on the direction which a signal of interest is incident on the receiver, and only the output(s) of the/those selected photodetector(s) 112a-112e are sent to the signal detector module 88 and/or decoder 87. For example, if the signal which is transmitted to the receiver 120 is incident in a first direction on the receiver, and the lens 111 will focus the incident light onto the first photodetector 112a, as is shown in FIG. 11, then only the output of this first photodetector 112a is sent to the signal detector module 88 and/or decoder 87 (via the single multiplexer 104).

The receiver 120 operates in a similar manner as the receiver 100 in FIG. 10.

In each of the above-mentioned receiver embodiments 60,70,80,100 the receiver 60,70,80,100,110, 120 is described as having first one or more photodetectors, second one or more photodetectors, and third one or more photodetectors; however it should be understood that any of the receiver 60,70,80,100,110, 120 embodiments described in the present application could have any number of one or more photodetectors greater than two; that is to say any of the receiver 60,70,80,100,110, 120 embodiments described in the present application will comprise at least first one or more photodetectors, and second one or more photodetectors; but the receiver 60,70,80,100 of the present invention is not limited to having only a first one or more photodetectors, and second one or more photodetectors, rather the receiver 60,70,80,100,110, 120 may have any number of additional one or more photodetectors in addition to the first one or more photodetectors, and second one or more photodetectors.

It should be understood that in the present application a decoder is a functional block which is configured to convert an analog input signal into a sequence of digital bits. In the simplest form, for on-off keying (pulse modulation), this can be a comparator that compares the input signal against a threshold. If the input signal is higher than the threshold, it outputs a '1' bit, otherwise a '0' bit.

In the present application the "quality factor" can be any metric, or a combination of metrics, which indicate the quality of a signal. Preferably the "quality factor" could be the amplitude of the signal output from the photodetectors (peak-to-baseline difference) as a measure of signal strength—a higher value means better quality, and the controller selects the switch setting corresponding to the highest value. In another embodiment the "quality factor" may comprise higher-level metrics such as received bit-error rate, packet loss. The higher-level metrics such as bit error rate, or packet loss, assume that there is a decoder that converts the signal to digital bits, as well as some way to determine if the received bits are correct or not—well established methods such as a checksum, a cyclic redundancy check (CRC), and/or a forward error correction method such as Hamming codes, Reed-Solomon codes, or similar. Using any of these methods can determine if there are wrongly interpreted bits, or invalid packets. Counting the number of invalid bits, or invalid packets, per time unit, results in a metric that is zero if there are no errors (high quality signal), or a higher number if there are errors (low quality signal). The controller will select the receptor with the lowest number of errors.

The "quality factor" may be any one of the aforementioned metrics, or a combination of a plurality of those metrics, such that the quality factor is a high value for a strong, error-free signal, output from the photodetectors, and is a low value for a weak, noisy, error-prone signal output from the photodetectors.

It should be understood that the receiver 50, 60,70,80, 100,110, 120 embodiments described above (and shown in FIGS. 5-8 and 10 respectively), may additionally have any of the features of the receivers 1,20,30,40. For example any of the receivers 50, 60,70,80,100,110, 120 may additionally comprise an amplifier 6 which has a gain and the controller of the receiver 50, 60,70,80,100,110, 120 may be configured to increase or decrease the gain in the same manner as the controller 4 of the receiver 1. The receivers 50, 60,70,80, 100,110, 120 may comprise any of the other features of the receivers 1,20,30,40. In general any receiver embodiment described herein, may additionally have any of the features of any of the other receiver embodiments described herein. For example the receivers 50, 60,70,80,100,110, 120 may comprise some or all of the features of the receiver 1, such as, least a first electrically controllable switch 3a and second electrically controllable switch 3b, wherein the first electrically controllable switch 3a may be selectively closed so as to electrically connect the first one or more photodetectors 2a,12a to the output node 5, and the second electrically controllable switch 3b may be selectively closed so as to connect the second one or more photodetectors 2b,12b to the output node 5; a controller 4 which is connected to said at least first electrically controllable switch 3a and second electrically controllable switch 3b so that the controller 4 can selectively operate the first and second controllable switches 3a,3b, wherein, the controller 4 is configured to operate the first electrically controllable switch 3a and the second electrically controllable switch 3b based on the signal at the output node 5, so as to adjust the level of sensitivity of the receiver to light incident on the receiver.

According to a further aspect of the present invention there is provided a communication assembly configured to operate in an underwater environment, which comprises a transmitter which is selectively operable to emit light, and a receiver according to any one of the above-mentioned embodiments, which is arranged to receive light emitted by the transmitter. In a preferred embodiment the communication assembly is a free space optical communication assembly. In the most preferred embodiment of the communication assembly the transmitter is located on a submersible robot, and/or a submerged sensor device, and/or a submerged structure with a cabled data connection to a communication network above water.

In a preferred embodiment the communication assembly comprises a water-proof housing in which the receiver is housed, wherein the water-proof housing comprises at least a section which is optically transparent so that optical signals from the transmitter can pass through the housing to the detection areas of the receiver. In another embodiment the communication assembly comprises a water-proof housing in which the transmitter is housed, wherein the water-proof housing comprises at least a section which is optically transparent, so that optical signals emitted by the transmitter can pass through the housing towards the receiver.

In an embodiment the receiver of the communication assembly is embedded within a transparent resin, wherein the transparent resin is configured to block liquid from entering into the receiver when the receiver is submerged within said liquid. In an embodiment the transmitter of the communication assembly is embedded within a transparent resin, wherein the transparent resin is configured to block liquid from entering into the transmitter when the transmitter is submerged within said liquid.

Preferably in any of the afore-mentioned communication assembly embodiments the transparent resin comprises at least one of, plastic, epoxy, polyester, acrylic resin, transparent silicone rubber, silicone gel.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A receiver, suitable for use in a communication assembly configured to operate underwater, the receiver comprising,
   at least first one or more photodetectors and second one or more photodetectors, wherein the first one or more photodetectors define a first detection area which can receive light, and the second one or more photodetectors define a second detection area which can receive light;
   at least a first multiplexer which is configurable to selectively electrically connect any of the first one or more photodetectors or second one or more photodetectors to a signal detector module;
   a controller which is connected to said least a first multiplexer so that the controller can selectively configure the first multiplexer to electrically connect any of the first one or more photodetectors or second one or more photodetectors to the signal detector module;
   wherein, the controller is configured to,
      configure the first multiplexer to electrically connect the first one or more photodetectors to the signal detector module; and wherein the signal detector module is configured to then determine a first quality factor which is representative of the quality of a signal output from the first one or more photodetectors to the signal detector module; and
      configure the first multiplexer to electrically connect the second one or more photodetectors to the signal detector module; and wherein the signal detector module is configured to then determine a second quality factor which is representative of the quality of a signal output from the second one or more photodetectors to the signal detector module; and
      compare the first quality factor and second quality factor to determine which signal output is better quality; and
      configure the first multiplexer so that the first multiplexer electrically connects whichever of the first one or more photodetectors or second one or more photodetectors provides said better quality signal output to the signal detector module.

2. A receiver according to claim 1 wherein the receiver further comprises a second multiplexer which is configurable to electrically connect either the first one or more photodetectors or second one or more photodetectors to a decoder, and wherein the controller is configured to,
   configure the first multiplexer to electrically connect the first one or more photodetectors to the signal detector module;
   while the first one or more photodetectors is electrically connected to the signal detector module, configure the second multiplexer to electrically connect the second one or more photodetectors to the decoder;
   determine a quality factor which is which is representative of the quality of a signal output from the second one or more photodetectors to the decoder;
   compare the determined quality factor to a quality factor which is representative of the quality of a signal output from the first one or more photodetectors to the signal detector module to determine which signal output is better quality;
   configure the first multiplexer so that the first multiplexer electrically connects the second one or more photodetectors to the signal detector module if the quality of the signal output from the second one or more photodetectors to the decoder is better than the quality of a signal output from the first one or more photodetectors to the signal detector module.

3. A receiver according to claim 1 wherein the first one or more photodetectors comprise a first bandpass filter which is configured to filter light within a first wavelength range first; and the second one or more photodetectors comprises a second bandpass filter which is configured to filter light within a second wavelength range which is different to the first wavelength range.

4. A receiver according to claim 1 wherein the first one or more photodetectors are configured to receive light from a first direction only; and the second one or more photodetectors are configured to receive light from a second direction only which is different to the first direction.

5. A receiver according to claim 4 wherein the first one or more photodetectors and second one or more photodetectors, comprise, a housing with a pin hole opening, an wherein first one or more photodetectors are orientated so that the pin-hole opening is facing in the first direction so that the first one or more photodetectors receive light from the first direction only through the pin-hole; the second one or more photodetectors are orientated so that the pin-hole opening is facing in the second direction so that the second one or more photodetectors receive light from the second direction only through the pin-hole.

6. A receiver according to claim 4 wherein the first one or more photodetectors and second one or more photodetectors, comprise at least one of, a reflective cone, wherein the reflective cone of the photodetectors belonging to the first one or more photodetectors are orientated so that light, which is incident said first direction only, is focused onto a photoreceiver of the respective photodetectors belonging to the first one or more photodetectors, while light which is incident in other directions on the photodetectors is reflected away; and wherein the reflective cone of the photodetectors belonging to the second one or more photodetectors are orientated so that light, which is incident in said second direction only, is focused onto the photoreceiver of the respective photodetectors belonging to the second one or more photodetectors, while light which is incident in other directions on the photodetectors is reflected away.

7. A receiver according to claim 4 wherein the first one or more photodetectors and second one or more photodetectors, each comprise a respective lens,
wherein the lens belonging to the first one or more photodetectors is orientated so that the lenses focuses only the light which is incident in said first direction onto a single photoreceiver belonging to the first one or more photodetectors;
wherein the lens belonging to the second one or more photodetectors is orientated so that the lens focuses only the light which is incident in said second direction onto a single photoreceiver belonging to the second one or more photodetectors.

8. A receiver according to claim 1 wherein the first one or more photodetectors and the second one or more photodetectors are mounted behind a lens; wherein the lens is configured to focus light which is incident in a first direction onto the first one or more photodetectors; and wherein the lens is configured to focus light which is incident in a second direction onto the second one or more photodetectors.

9. A receiver according to claim 1 wherein the quality factor comprises at least one of the following metrics or a combination thereof: an amplitude of the signal output from the photodetectors; and/or a bit-error rate, and/or packet loss.

10. A receiver, suitable for use in a communication assembly configured to operate underwater, the receiver comprising,
at least first one or more photodetectors and second one or more photodetectors, wherein the first one or more photodetectors define a first detection area which can receive light, and the second one or more photodetectors define a second detection area which can receive light,
at least a first electrically controllable switch and second electrically controllable switch, wherein the first electrically controllable switch may be selectively closed so as to electrically connect the first one or more photodetectors to the output node, and the second electrically controllable switch may be selectively closed so as to connect the second one or more photodetectors to the output node;
a controller which is connected to said at least first electrically controllable switch and second electrically controllable switch so that the controller can selectively operate the first and second controllable switches,
wherein, the controller is configured to operate the first electrically controllable switch and the second electrically controllable switch based on the signal at the output node, so as to adjust the level of sensitivity of the receiver to light incident on the receiver.

11. A communication assembly configured to operate in an underwater environment, the assembly comprising,
a transmitter which is selectively operable to emit light, and
a receiver according to claim 1 which is arranged to receive light emitted by the transmitter.

12. A communication assembly according to claim 11, wherein the communication assembly comprises a water-proof housing in which the receiver is housed, wherein the water-proof housing comprises at least a section which is optically transparent.

13. A communication assembly according to claim 11, wherein the receiver is embedded within a transparent resin, wherein the transparent resin is configured to prevent liquid from entering the receiver when the communication assembly is submerged within said liquid.

14. A communication assembly according to claim 13 wherein the transparent resin comprises at least one of, plastic, epoxy, polyester, acrylic resin.

15. A communication assembly according to claim 11 wherein the transmitter is located on a submarine drone.

* * * * *